United States Patent
Lee

(10) Patent No.: US 7,808,600 B2
(45) Date of Patent: Oct. 5, 2010

(54) LIQUID CRYSTAL DISPLAY (LCD) DEVICE FOR REPAIRING

(75) Inventor: Sun Ah Lee, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 949 days.

(21) Appl. No.: 11/643,280

(22) Filed: Dec. 20, 2006

(65) Prior Publication Data

US 2008/0094563 A1 Apr. 24, 2008

Related U.S. Application Data

(62) Division of application No. 10/949,660, filed on Sep. 22, 2004, now Pat. No. 7,180,566.

(30) Foreign Application Priority Data

Apr. 2, 2004 (KR) .............................. P2004-22961

(51) Int. Cl.
G02F 1/1339 (2006.01)

(52) U.S. Cl. ...................... 349/153; 349/154; 349/190

(58) Field of Classification Search .................. 349/153, 349/154, 190

See application file for complete search history.

(56) References Cited

U.S. PATENT DOCUMENTS

| | | | |
|---|---|---|---|
| 6,179,679 B1 * | 1/2001 | von Gutfeld et al. .......... | 445/25 |
| 6,958,801 B2 * | 10/2005 | Lee et al. ..................... | 349/154 |
| 7,023,518 B1 * | 4/2006 | Koyama et al. ............. | 349/151 |
| 7,196,764 B2 * | 3/2007 | Ryu et al. ................... | 349/153 |
| 7,230,669 B1 * | 6/2007 | Tashiro et al. ............... | 349/153 |
| 2003/0179338 A1 * | 9/2003 | Kim ........................... | 349/153 |
| 2004/0160566 A1 * | 8/2004 | Kawabe et al. .............. | 349/153 |
| 2004/0183987 A1 * | 9/2004 | Suzuki ....................... | 349/153 |

FOREIGN PATENT DOCUMENTS

| | | |
|---|---|---|
| JP | 2001-222017 | 8/2001 |
| KR | 2001-222017 | 8/2001 |
| KR | 2003-0058769 | 7/2003 |
| KR | 2003-0076873 | 9/2003 |

OTHER PUBLICATIONS

Office Action dated Jul. 20, 2006 for corresponding Korean Patent Application No. 10-2004-0022961.
Office Action dated Mar. 21, 2006 for corresponding Korean Patent Application No. 10-2004-0022961.
Office Action dated Jul. 20, 2006, for corresponding Korean Patent Application No. 10-2004-0022961.

* cited by examiner

*Primary Examiner*—Julie-Huyen L Ngo
(74) *Attorney, Agent, or Firm*—Brinks Hofer Gilson & Lione

(57) ABSTRACT

An LCD device for repairing to prevent gravity defects by forming a dual seal pattern in a non-display area of an LCD panel and storing surplus liquid crystal in an area between the dual seal patterns, which includes a liquid crystal panel including first and second substrates bonded to each other, and having a display area and non-display area, first and second seal patterns surrounding the display area and spaced apart from each other on the non-display area between the first and second substrates and defining a buffer space therebetween and a metal pattern formed on the first substrate under the first seal pattern, wherein the metal pattern is deformed by laser irradiation to form a path for liquid crystal to flow between the buffer space and the display area.

11 Claims, 25 Drawing Sheets

LIQUID CRYSTAL DISPLAY (LCD) DEVICE FOR REPAIRING

PRIORITY CLAIM

This application is a divisional application of and claims the benefit of U.S. patent application Ser. No. 10/949,660 filed Sep. 22, 2004 now U.S. Pat. No. 7,180,566 and this application claims the benefit of Korean Application No. P2004-22961, filed Apr. 2, 2004, which is are hereby incorporated by reference.

TECHNICAL FIELD

The present invention relates to a liquid crystal display (LCD) device and more particularly, to a liquid crystal display (LCD) device and methods for fabricating and repairing LCD devices to prevent gravity defect by forming a dual seal pattern in a non-display area of an LCD panel, and storing surplus liquid crystal in an area between the dual seal patterns.

BACKGROUND

Demands for various display devices have increased with development of an information society. Accordingly, many efforts have been made to research and develop various flat display devices such as liquid crystal display (LCD), plasma display panel (PDP), electroluminescent display (ELD), and vacuum fluorescent display (VFD). Some species of flat display devices have already been applied to displays for various equipment. Among the various flat display devices, liquid crystal display (LCD) devices have been most widely used due to advantageous characteristics of thin profile, lightness in weight, and low power consumption, whereby the LCD devices provide a substitute for a Cathode Ray Tube (CRT). In addition to mobile type LCD devices such as a display for a notebook computer, LCD devices have been developed for computer monitors and televisions to receive and display broadcasting signals. Despite various technical developments in LCD technology having applications in different fields, research in enhancing the picture quality of the LCD device has been, in some respects, lacking as compared to other aspects of the LCD device. In order to use LCD devices in various fields as a general display, the key to developing LCD devices depends on whether LCD devices can provide a high quality picture, such as high resolution and high luminance with a large-sized screen, while still maintaining lightness in weight, thin profile, and low power consumption.

Hereinafter, a related art LCD device and spacers for maintaining a cell gap between substrates therein will be described with reference to the accompanying drawings. FIG. 1 is an exploded perspective view illustrating a related art LCD device. The related art LCD device includes first and second substrates 1 and 2, and a liquid crystal layer 3 formed between the first and second substrates 1 and 2 by injection. In more detail, the first substrate 1 includes a plurality of gate lines 4 arranged along a first direction at fixed intervals, a plurality of data lines 5 arranged along a second direction perpendicular to the first direction at fixed intervals. A plurality of pixel electrodes 6 are arranged in a matrix-type configuration within pixel regions P defined by crossing of the gate and data lines 4 and 5. The first substrate 1 also includes a plurality of thin film transistors T for transmitting data signals from the data lines to the respective pixel electrodes according to gate pulse signals supplied to the gate lines. Also, the second substrate 2 includes a black matrix layer 7 that blocks light from portions of the first substrate 1 except the pixel regions P, an R/G/B color filter layer 8 for displaying various colors, and a common electrode 9 for producing the image on the color filter layer 8. In the aforementioned LCD device, the liquid crystal layer 3 is formed between the first and second substrates 1 and 2, wherein liquid crystal molecules of the liquid crystal layer 3 are driven by an electric field generated between the pixel electrode 6 and the common electrode 9. That is, an alignment direction of the liquid crystal molecules of the liquid crystal layer 3 is controlled by the induced electric field thereto. Accordingly, light irradiated through the liquid crystal layer 3 may be controlled by the alignment direction of the liquid crystal molecules, thereby displaying the image. This kind of LCD device is referred to as a TN mode LCD device, which has disadvantageous characteristics such as a narrow viewing angle. In order to overcome the narrow viewing angle, an IPS (In-Plane switching) mode LCD device has been developed actively. In the IPS mode LCD device, a pixel electrode and a common electrode are formed in a pixel region in parallel to each other at a fixed interval therebetween with this configuration, an electric field parallel to substrates develops between the pixel electrode and the common electrode, thereby aligning liquid crystal molecules of a liquid crystal layer to the electric field parallel to the substrates.

Hereinafter, a method of manufacturing a related art IPS mode LCD device will be described with reference to the accompanying drawings. In general, the method of manufacturing an LCD device is classified as either a liquid crystal injection method or a liquid crystal dispensing method depending upon the a method of forming the liquid crystal layer.

First, the method of manufacturing the LCD device according to the liquid crystal injection method will be described as follows. FIG. 2 is a flow chart illustrating the method of manufacturing the LCD device according to the liquid crystal injection method. The method of manufacturing the LCD device is divided into three processes an array process, a cell process, and a module process. The array process largely includes two steps of forming a TFT array (A) having gate and data lines, a pixel electrode, and a thin film transistor on a TFT substrate, and forming a color filter array (B) having a black matrix layer, a color filter layer, and a common electrode on a second substrate. During the array process, a plurality of LCD panel regions are defined on one large sized glass substrate, and the TFT array and the color filter array are formed in each LCD panel region. After that, the TFT substrate and the color filter substrate are moved to a cell process line. Subsequently, an alignment material is deposited on the TFT substrate and the color filter substrate, and an alignment process (rubbing process) (S10) is performed to the TFT and the color filter substrates to obtain a uniform alignment direction in the liquid crystal molecules. At this time, the alignment process (S10) is carried out in sequential processes for cleaning, before deposition of an alignment layer, printing the alignment layer, baking the alignment layer, inspecting the alignment layer, and rubbing the alignment layer. Accordingly, the TFT substrate and the color filter substrate are respectively cleaned (S20). Then, ball spacers for maintaining a cell gap between the two substrates are scattered on one of the two substrates (S30), and a seal pattern having an injection inlet is formed corresponding to the circumference of respective LCD panel regions to bond the two substrates to each other (S40). At this time, the seal pattern has a liquid crystal injection inlet through which liquid crystal is injected. The ball spacers are formed of plastic balls or elastic plastic minute particles. Then, the TFT substrate and the color filter substrate having the seal pattern therebetween are brought together, and bonded to each other, and then the seal pattern is hardened (S50). After that, the TFT substrate and the color filter substrate are cut into the respective LCD panel regions (S60), thereby manufacturing the unit LCD panels each having a fixed size. Subsequently, the liquid crystal is injected into the LCD panel through the injection inlet, and then the injection inlet is sealed (S70), to form a liquid crystal layer. After an inspection process (S80) for external appearance and electric failure in the LCD panel, the process of manufacturing the LCD device is completed. Following the cell process, the module process is carried out to complete fabrication of the LCD device.

The process for injecting the liquid crystal will now be described. First, the LCD panel and a container having liquid crystal material therein are provided in a chamber, and the chamber is evacuated. Moisture and air bubbles in the liquid crystal material and the container are simultaneously removed, and an inside space of the LCD panel is maintained in a vacuum state. Then, the injection inlet of the LCD panel is dipped into a container having the liquid crystal material in the vacuum state, and the vacuum state inside the chamber is brought to atmospheric pressure. Thus, the liquid crystal material is injected into the LCD panel through the injection inlet by a pressure difference between the inside the LCD panel and the chamber.

However, the method of manufacturing the LCD device by the liquid crystal injection method has the following disadvantages. First, after cutting the large sized glass substrate into the respective LCD panel regions, the injection inlet is dipped into the container having the liquid crystal material while maintaining the vacuum state between the two substrates. The process of injecting liquid crystal material between the two substrates is slow thereby lowering yield. Also in the case of forming a large sized LCD device, it is difficult to completely inject the liquid crystal material into the inside of the LCD panel, thereby causing failure due to incomplete injection of the liquid crystal material. Furthermore, the process of the liquid crystal material is slow and a large space is required for the liquid crystal injection device.

In order to overcome the problems with liquid crystal injection method, the liquid crystal dispensing method has been developed. In the dispensing method, two substrates are bonded to each other after dispensing liquid crystal material on any one of the two substrates. FIG. 3 is a flow chart illustrating a method of manufacturing an LCD device according to the liquid crystal dispensing method. Liquid crystal dispensing methods are disclosed in co-pending patent applications having Ser. No. 10/184,083, publication no. 20030145944, Ser. No. 10/184,117, publication no. 20030147039, and Ser. No. 10/10/184,076, publication no. 20030145943, all filed Jun. 28, 2002, the disclosures of which are incorporated by reference herein. In the method of manufacturing the LCD device according to the liquid crystal dispensing method, before bonding the two substrates, the liquid crystal is dispensed on either the TFT substrate or the color filter substrate. In this method, it is impossible to use ball spacers for maintaining a cell gap between the two substrates since the ball spacers move in the spreading direction of liquid crystal material. Thus, instead of the ball spacers, patterned spacers or column spacers are fixed to any one of the two substrates to maintain the cell gap between the two substrates. During the array fabrication process, a black matrix layer, a color filter layer and a common electrode are formed on the color filter substrate (not shown). Then, a photosensitive resin is formed on the common electrode and selectively removed to form the column spacers on the black matrix layer. The column spacers may be formed in a photo process or an ink-jet process. After that, alignment layers are respectively deposited on the entire surfaces of the TFT substrate and the color filter substrate including the column spacers, and a rubbing process is performed thereto (S100). After cleaning the TFT substrate and the color filter substrate (S101), the liquid crystal material is dispensed on one of the two substrates (S102), and a seal pattern is formed in the circumference of an LCD panel region on the other of the two substrates by a dispensing device (S103). At this time, it is possible to dispose the liquid crystal and form the seal pattern on any one of the two substrates. After the other substrate having no the liquid crystal material is inversed (S104), the TFT substrate and the color filter substrate are bonded to each other by pressure, and the seal patterned is hardened (S105). Subsequently, the bonded substrates are cut into the respective LCD panels (S106). Finally, an inspection process (S107) for external appearance and electric failure in the LCD panel is performed, so that the process of manufacturing the LCD device is completed.

In the method of fabricating the LCD device according to the liquid crystal dispensing method, the column spacers are formed on the color filter substrate, the liquid crystal is dispensed on the TFT substrate, and the two substrates are bonded together thereby completing the LCD panel. At this time, the column spacers are fixed on the color filter substrate, and the color filter substrate is in contact with the TFT substrate. Then, the contact portion of the TFT substrate has a predetermined height from the color filter substrate corresponding to any one line of the gate and data lines. Meanwhile, in case of the large sized LCD device, the liquid crystal dispensing method is generally used due to advantageous characteristics such as decreased fabrication time. At this time, the amount of liquid crystal dispensed on the LCD panel is a very important factor in the performance of the LCD panel. Especially, if excess liquid crystal is dispensed on the LCD panel, the LCD device may have gravity defects. In this case, it is necessary to repair the gravity defect of the LCD device since the gravity defect may cause failure of the LCD device after the bonding process of the substrates. This problem has not been solved.

Hereinafter, gravity defects will be described with reference to the accompanying drawings. FIG. 4 is a photograph of a gravity defect in an LCD device according to the related art. FIG. 5 is a cross sectional view taken along section line I-I' of FIG. 4. As show in FIG. 4, a gravity defect (inducted by the widened area of the right hand side of the figure) arises at a lower corner of the LCD panel, adjacent to the ground. For example, when the LCD panel is maintained in a vertical direction, liquid crystal molecules of the LCD panel migrate to the lower corner direction, thereby causing the gathering of liquid crystal molecules to the predetermined portion on the LCD panel due to the effects of gravity. As a result, the gathered liquid crystal molecules are expanded as the temperature increases, so that a portion of the LCD panel, adjacent to the ground protrudes.

If the LCD panel is maintained at a normal temperature, even though the liquid crystal molecules migrate to the lower corner direction, the gravity defect does not affect the LCD panel the lower and upper substrates are spaced from each other at a height corresponding to the column spacer, and the liquid crystal is formed at a height corresponding to the column spacer between the two substrates. However, when the LCD panel is maintained at a high temperature, the liquid crystal at the lower corner of the LCD panel adjacent to the ground is saturated and expands with the rise in the temperature. The expanded liquid crystal portion increases the cell gap. Accordingly, if the LCD panel has a gravity defect, there is a difference of light transmission between the portion having a normal cell gap and the lower corner of the LCD panel adjacent to the ground, and opaque spots occur at the corner of the LCD panel.

In the cross section of the LCD panel 10, as shown in FIG. 5, the column spacers 30 provided at the lower corner of the LCD panel 10 come apart from the lower substrate 1, due to expansion of liquid crystal. As a result, it is impossible to support the lower and upper substrates 1 and 2 with the column spacers 30 at the lower corner of the LCD panel 10. Especially, as shown in FIG. 4 and FIG. 5, if the liquid crystal is excessively dispensed on the LCD panel 10 when maintaining the LCD panel 10 in a vertical orientation, the liquid crystal flows to the lower corner of the LCD panel 10 due to gravity, thereby increasing the size of the protruding portion at the lower corner of the LCD panel.

At this time, the seal pattern 25 is formed in the circumference of the LCD panel 10, to bond the lower and upper substrates 1 and 2 to each other. Then, the liquid crystal layer 3 is formed between the lower and upper substrates 1 and 2 with the dispensed liquid crystal. In this liquid crystal layer 3, the cell gap of the portion having the gravity defect is different from the cell gap of the portion having no gravity defect.

FIG. 6 is a plane view of an LCD panel of an LCD device according to the related art and FIG. 7 is a cross sectional view taken along Section line II-II' of FIG. 6.

Referring to FIG. 6, an LCD panel 10 of an LCD device according to the related art includes a lower substrate 1 having a thin film transistor array, an upper substrate 2 leaving a color filter array in opposite to the lower substrate 1, and a liquid crystal layer 3 (FIG. 5) between the lower and upper substrates 1 and 2. In to allow a margin for connection with a driving part, the lower substrate 1 is relatively larger than the upper substrate 2.

The LCD panel 10 is defined as a display area (area within a dotted line) for displaying substantial images, and a non-display area (outside the dotted line) around the display area. In the non-display area of the LCD panel, a seal pattern 25 is formed to bond and support the two substrates 1 and 2. In the non-display area inside the seal pattern 25, a liquid crystal margin region is formed. Also, a black matrix layer (not shown) is formed on the upper substrate 2 in the non-display area to prevent light leakage. As described above, the black matrix layer is selectively formed in the display area.

Referring to FIG. 7, the seal pattern 25 in the non-display area is formed on any one of the lower and upper substrates 1 and 2. Then, the black matrix layer 135 is formed on the upper substrate 2 of the non-display area, to prevent light leakage. Accordingly, after bonding the lower and upper substrates 1 and 2, the seal pattern 25 is formed in correspondence with the black matrix layer 135.

Accordingly, the related art LCD device has the following disadvantages. The formation method of the liquid crystal layer between the lower and upper substrates of the LCD panel is classified into the liquid crystal injection method and the liquid crystal dispensing method. In the liquid crystal injection method, the liquid crystal is injected into the space between the lower and upper substrates of the LCD panel in the vacuum state by the capillary action. In the liquid crystal dispensing method, the liquid crystal is dispensed on the LCD panel. In the case of large sized LCD panels, the liquid crystal dispensing method is more advantageous than the liquid crystal injection method in that the liquid crystal injection method has the disadvantageous characteristics such as low yield and increased fabrication time. In the case of the liquid crystal dispensing method, the liquid crystal is dispensed on any one of the substrates at a measured amount. In this case, if the measured amount of liquid crystal dispensed on the LCD panel is incorrect due to internal changes of the LCD panel, it may have the problems. For example, if excess liquid crystal is dispensed on the LCD panel, it may cause a gravity defect. Alternatively, if the liquid crystal is deficient, it may result in poor display quality. If excessive liquid crystal is dispensed on the LCD panel, and the LCD panel is maintained at a high temperature, complete failure of the LCD panel is possible.

SUMMARY

Accordingly, the present invention is directed to an LCD device and a method of fabricating and repairing an LCD device that substantially obviates one or more problems due to limitations and disadvantages of the related art.

In accordance with one embodiment of the invention, a liquid crystal display (LCD) device includes an LCD panel including first and second substrates bonded to each other, and having display and non-display areas. First and second seal patterns are spaced apart from each other on the non-display area between the first and second substrates and surrounding the display area to define a buffer space therebetween. A metal pattern on the first substrate corresponds to the first seal pattern. The metal pattern includes a path for liquid crystal to between the buffer space and the display area.

In one aspect, the metal pattern includes a path for surplus liquid crystal when the liquid crystal is oversupplied between the first and second substrate.

In another embodiment of the invention, a repairing method of an LCD device including an LCD panel having two substrates and having as display and non-display areas; a liquid crystal between the two substrates in the display area; first and second seal patterns provided at a predetermined interval in the non-display area between the first and second substrate, and surrounding the display area to define a buffer space therebetween; and a metal pattern below the first seal pattern, heating the method including the metal pattern to form a path for the liquid crystal to flow to the buffer space and flowing liquid crystal in the LCD panel to the buffer space through the path.

In yet another embodiment of the invention, a repairing method of an LCD device including an LCD panel having two substrates and having display and non-display areas; a liquid crystal between the two substrates in the display area; first and second seal patterns provided at a predetermined interval in the non-display area between the first and second substrates and surrounding the display area of the LCD panel to define a buffer space therebetween; dividers for dividing the buffer space into a plurality of parts; and a metal pattern below the first seal pattern, the method including laser irradiating the metal pattern to form at least one path, according to the amount of liquid crystal inside the LCD panel; and flowing surplus liquid crystal to the buffer space through least one path.

In still another embodiment of the invention, a repairing method of an LCD device including an LCD panel having two substrates and defined as display and non-display areas; a liquid crystal between the two substrates in the display area; first and second seal patterns provided at a predetermined interval in the non-display area between the first and second substrate, and surrounding the display area to define a buffer space therebetween; dividers for dividing the buffer space into a plurality of parts; and first and second metal patterns below the first seal pattern and the dividers the method including laser irradiating the first metal pattern to form a first path for the liquid crystal to flow to the buffer space; laser irradiating the second metal pattern to form a second path according to the amount of surplus liquid crystal of the LCD panel; and flowing the surplus liquid crystal to the buffer space through the first path and the second path.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display (LCD) device and a repairing method thereof according to the present invention will be described with reference to the accompanying drawings.

Figure 1:
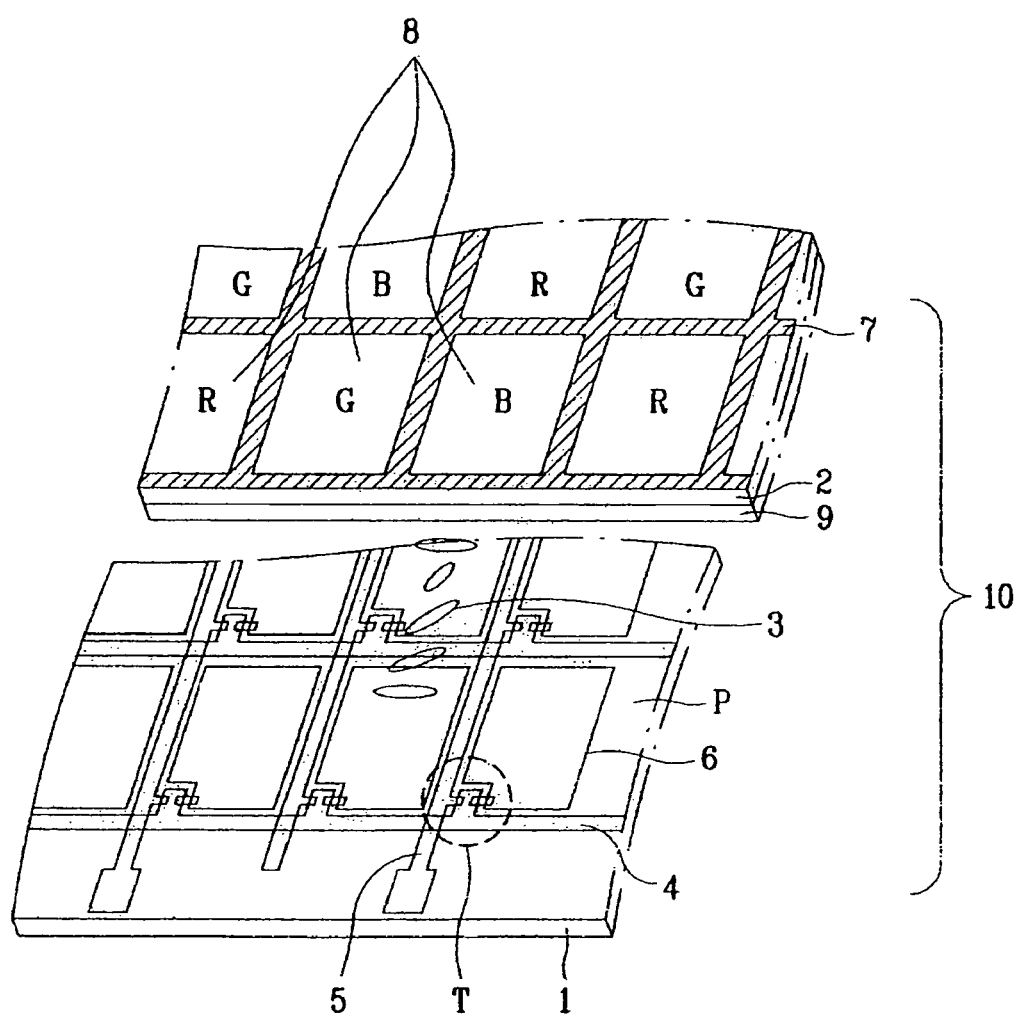
FIG. 1 is an exploded perspective view illustrating related art LCD device.
Figure 2:
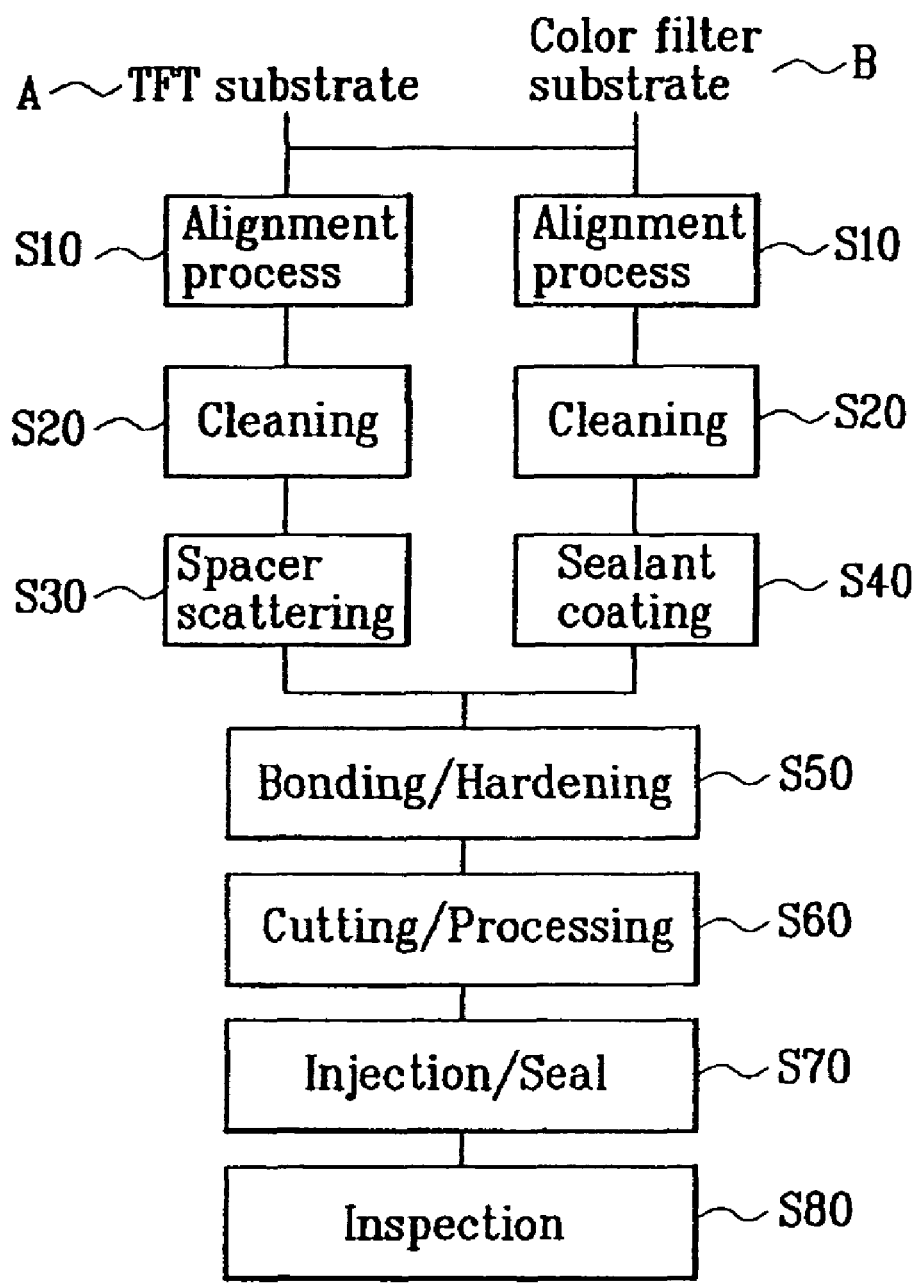
FIG. 2 is a flow chart illustrating a method of manufacturing an LCD device according to a related art liquid crystal injection method.
Figure 3:
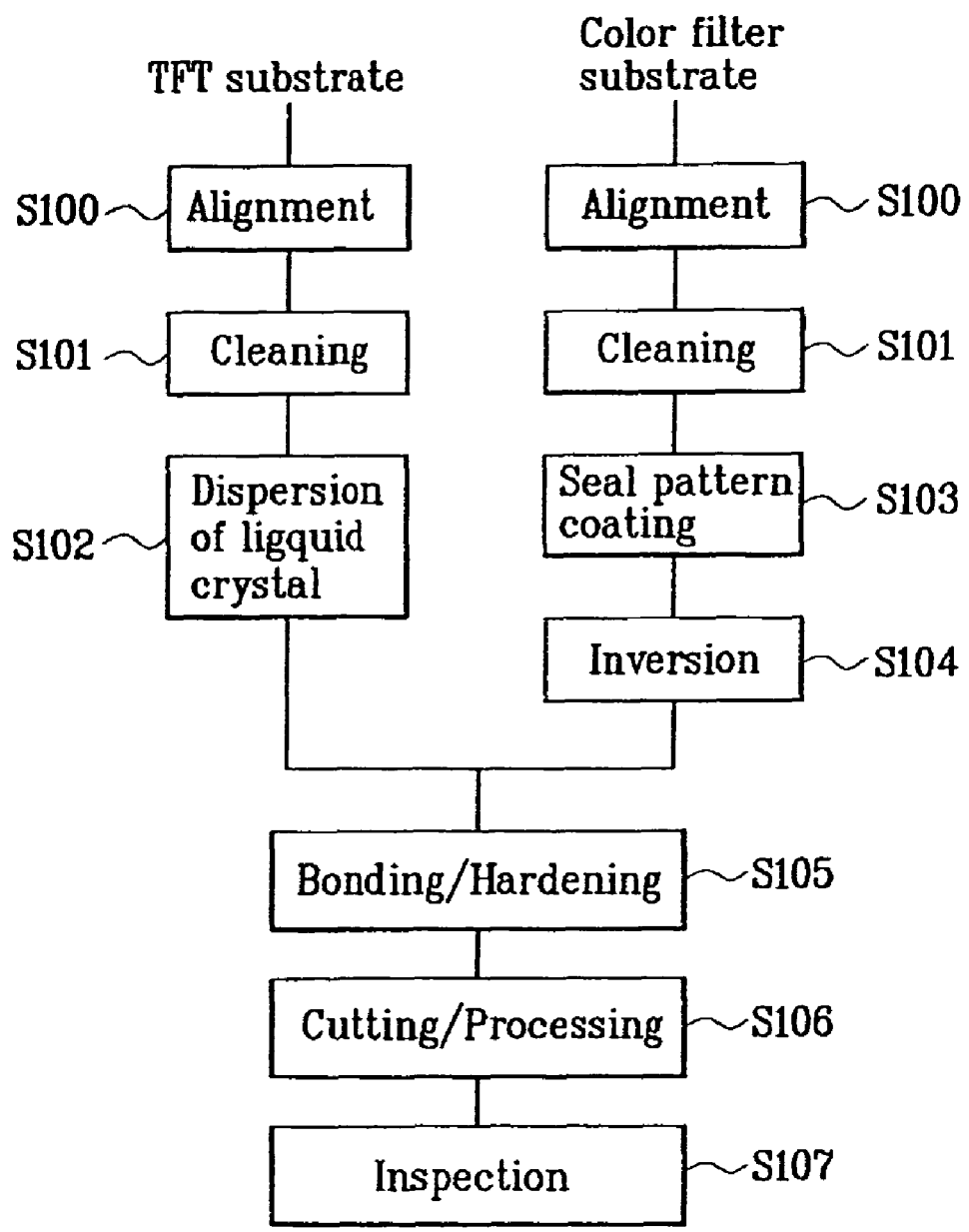
FIG. 3 is a flow chart illustrating a method of manufacturing an LCD device according to a related art liquid crystal dispensing method.
Figure 4:
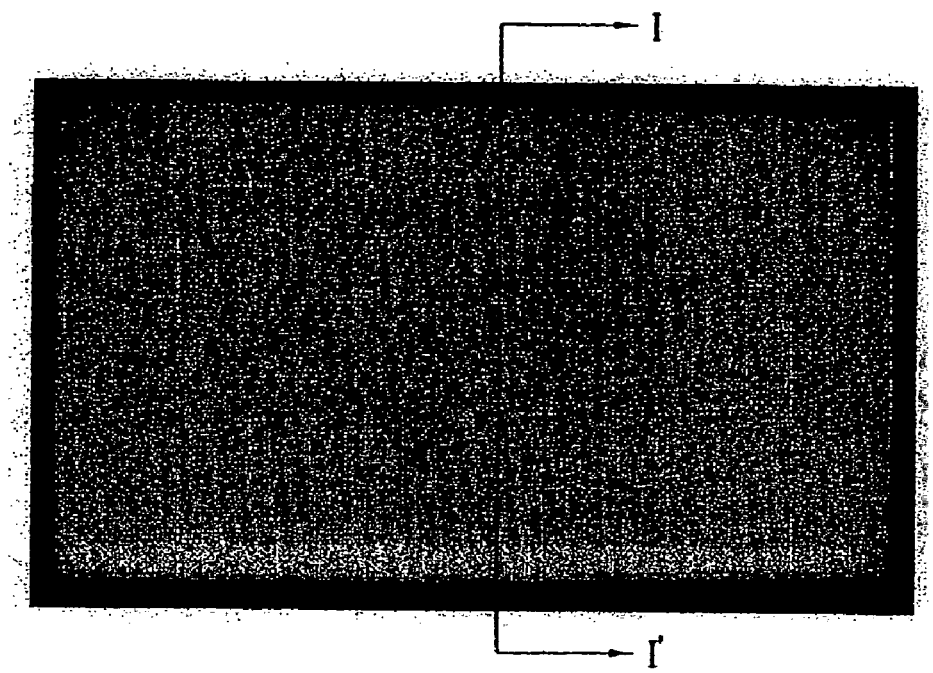
FIG. 4 is a photograph of a gravity defect in an LCD device according to the related art.
Figure 5:
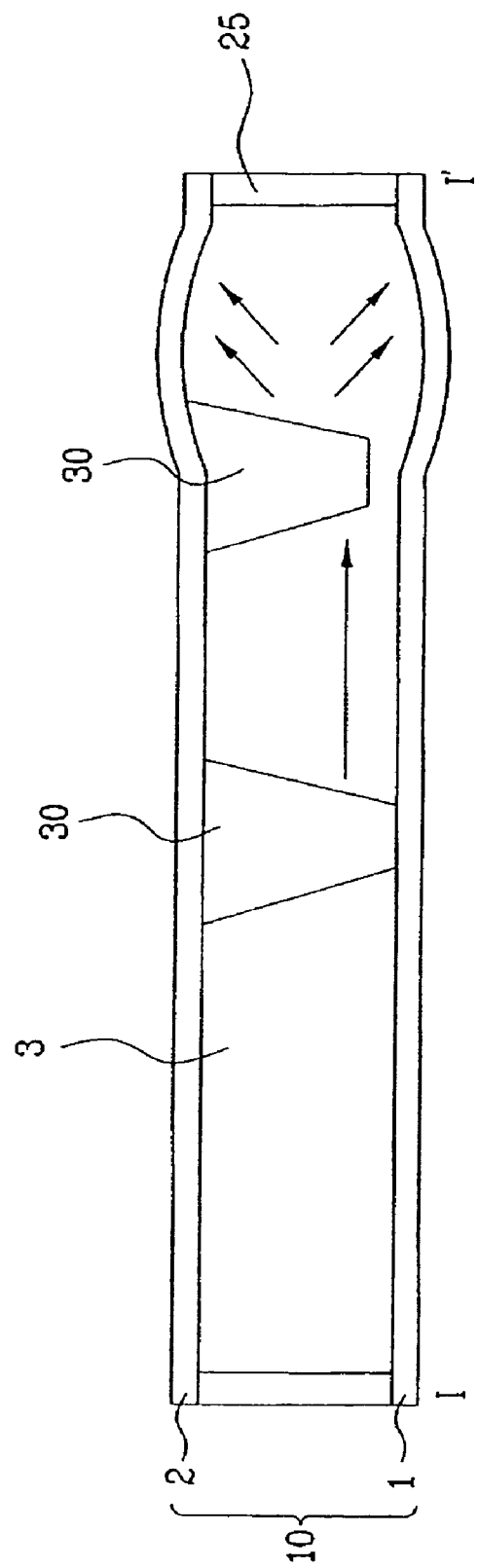
FIG. 5 is a cross sectional view along I-I' of FIG. 4.
Figure 6:
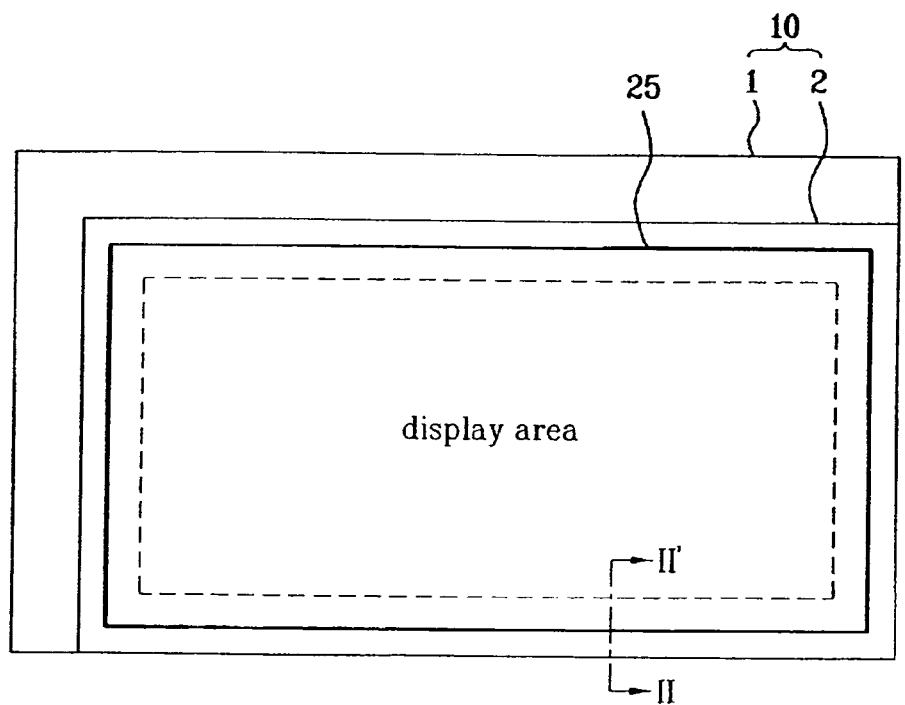
FIG. 6 is a plane view of an LCD panel of an LCD device according to the related art.
Figure 7:
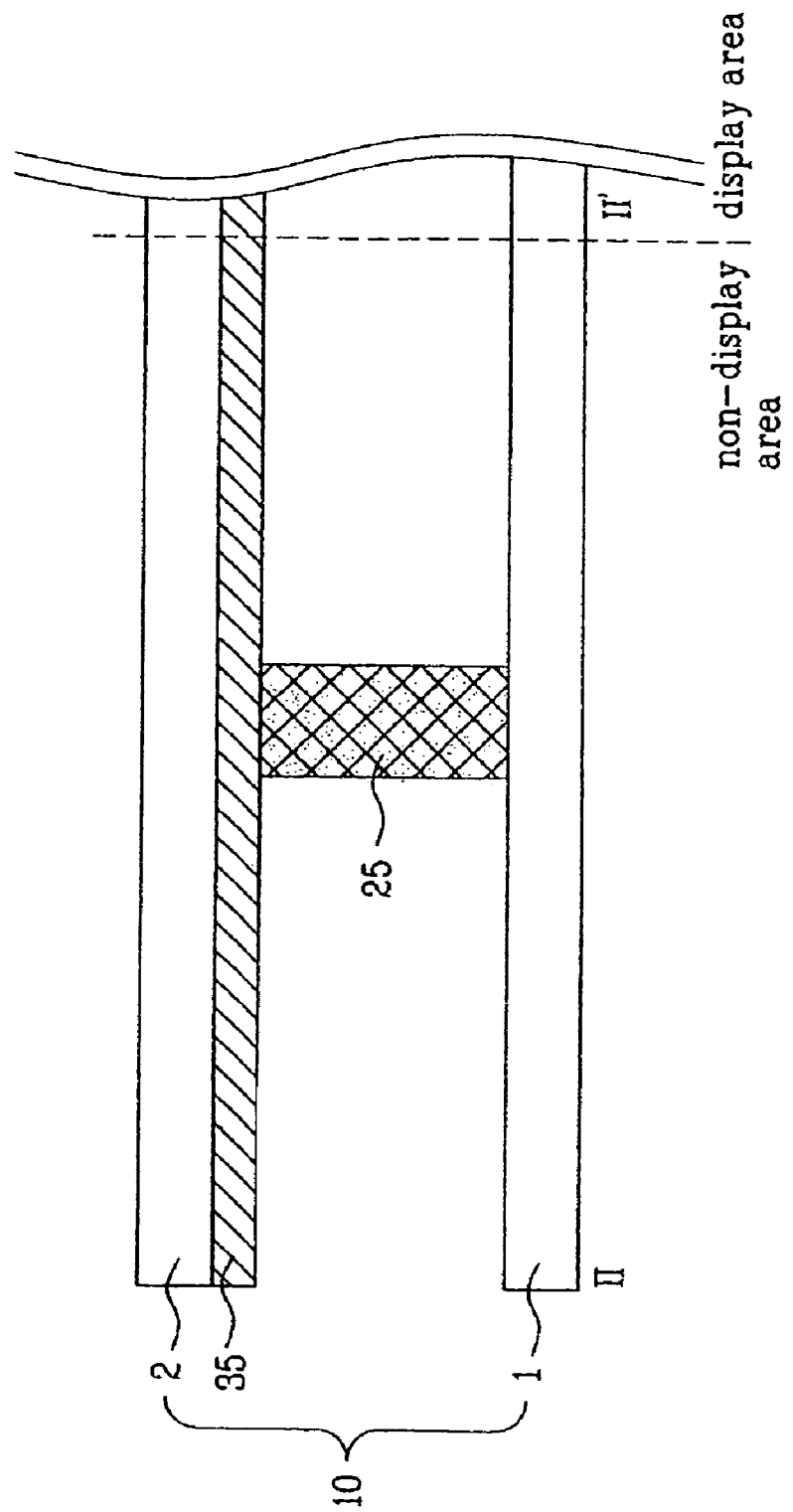
FIG. 7 is a cross sectional view along II-II' of FIG. 6.
Figure 8:
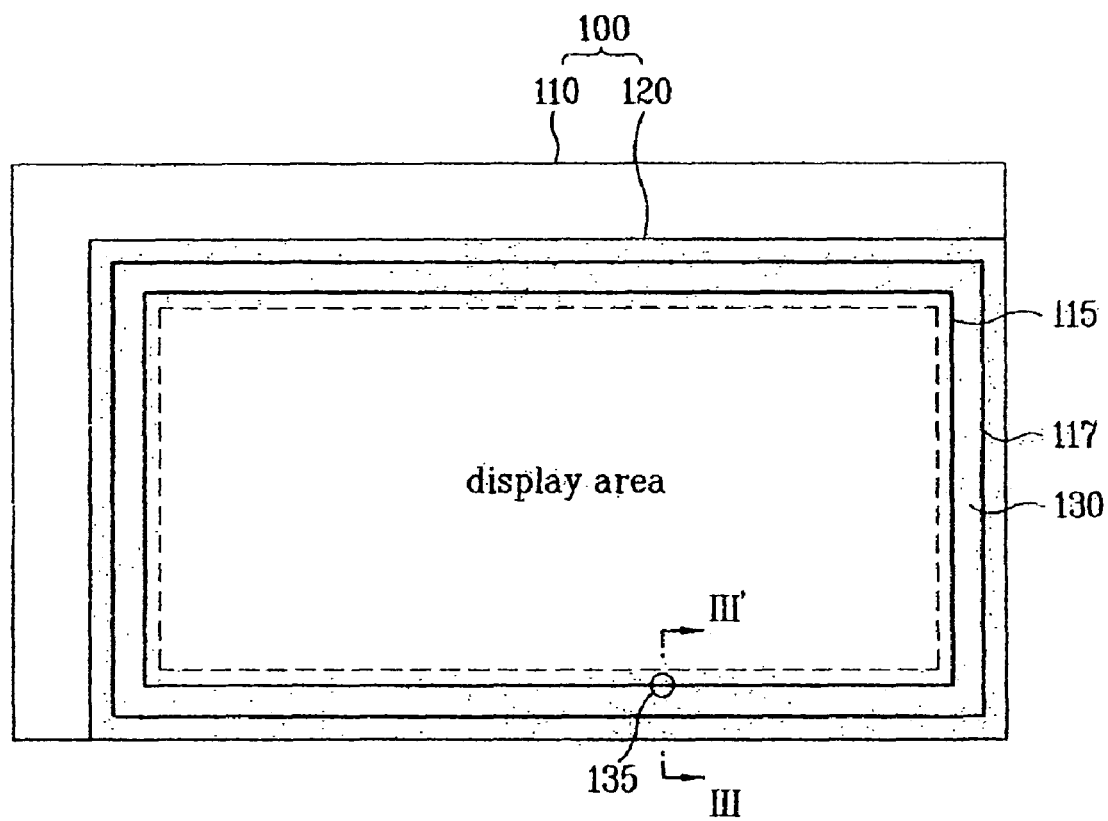
FIG. 8 is a plane view of an LCD device according to a first embodiment of the present invention.
Figure 9A:
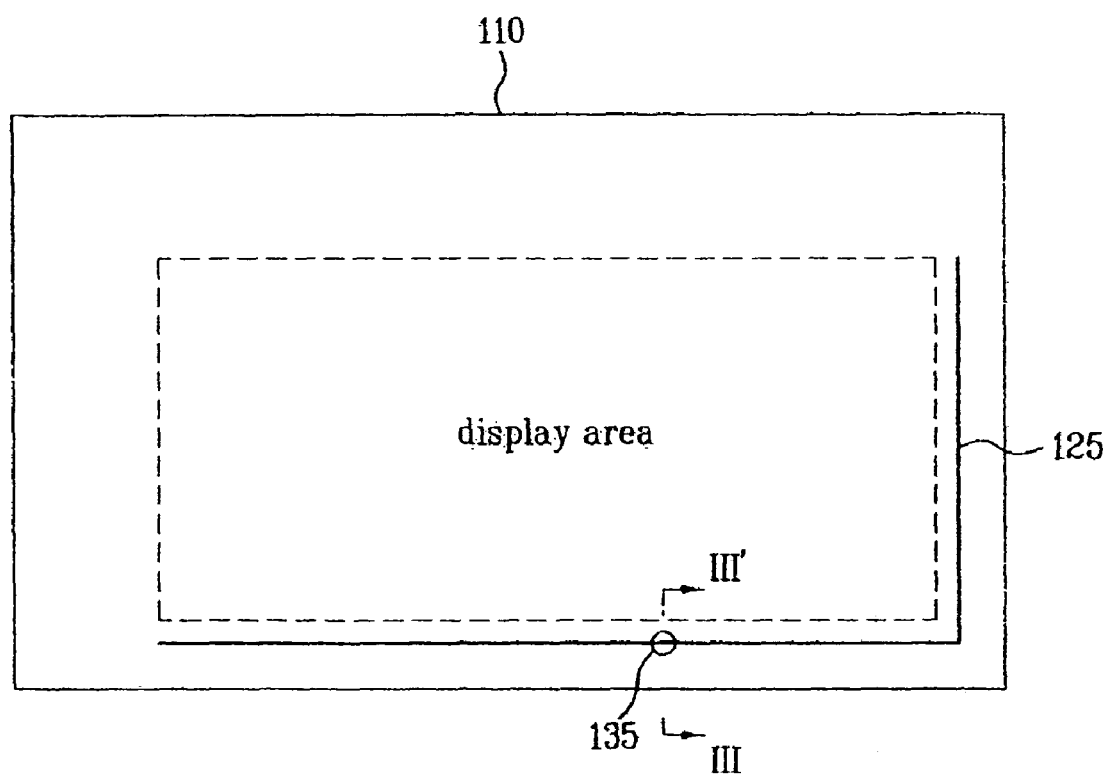
FIG. 9A is a plane view of a lower substrate having a metal pattern of FIG. 8.

Referring to FIGS. 8, 9 and 10, shown in FIG. 8, an LCD device according to a first embodiment of the present invention includes an LCD panel 100 having display and non-display areas, A driving part (not shown) and a backlight unit (not shown) are connected with the LCD panel 100. More specifically, the LCD panel 100 includes a lower substrate 110 having a TFT array, an opposite upper substrate 120 having a color filter array, and a liquid crystal layer (not shown) formed between the lower and upper substrates 110 and 120. To create a margin for connecting with the driving part (not shown), the lower substrate 110 is relatively larger than the upper substrate 120.

In a fabrication process, first and second seal patterns 115 and 117, respectively, are formed in the non-display area of any one of the lower and upper substrates 10 and 120, wherein the first and second seal patterns 115 and 117 surround the display area of any one substrate. At this time, the first and second seal patterns 115 and 117 are spaced apart from each other to define a buffer space 130 therebetween, wherein the buffer space 130 is a predetermined space formed in the non-display area to store surplus liquid crystal. Then, a metal pattern 125 (FIGS. 9A and 9B) is formed on the lower substrate 110 at a portion corresponding to the first seal pattern 115, and an insulating layer 126 (FIGS. 10A and 10B) is formed on an entire surface of the lower substrate 110 including the metal pattern 125.

The lower and upper substrates 110 and 120 are bonded to and supported each other by the first seal pattern 115. The metal pattern 125 is formed on the lower substrate 110 corresponding to a predetermined portion of the first seal pattern 115. The metal pattern 125 has to be substantially formed in a portion having no effect on a display mode, for example, in the non-display area. Also, since it is necessary to form a path by deforming the metal pattern 125 by laser irradiation, the metal pattern 125 has to be substantially formed in a portion having no gate pad or data pad, so that the liquid crystal is activated without any deleting effects from the laser irradiation. Thus, as shown in FIG. 9, the formation of the metal pattern 125 is limited to the non-display area. As shown in the drawings, the metal pattern 125 may optimally be formed in sequence, or not. Also, the metal pattern 125 may be formed in a variety of patterns including straight "—" as well as angle "⌐" patterns.

Figure 9B:
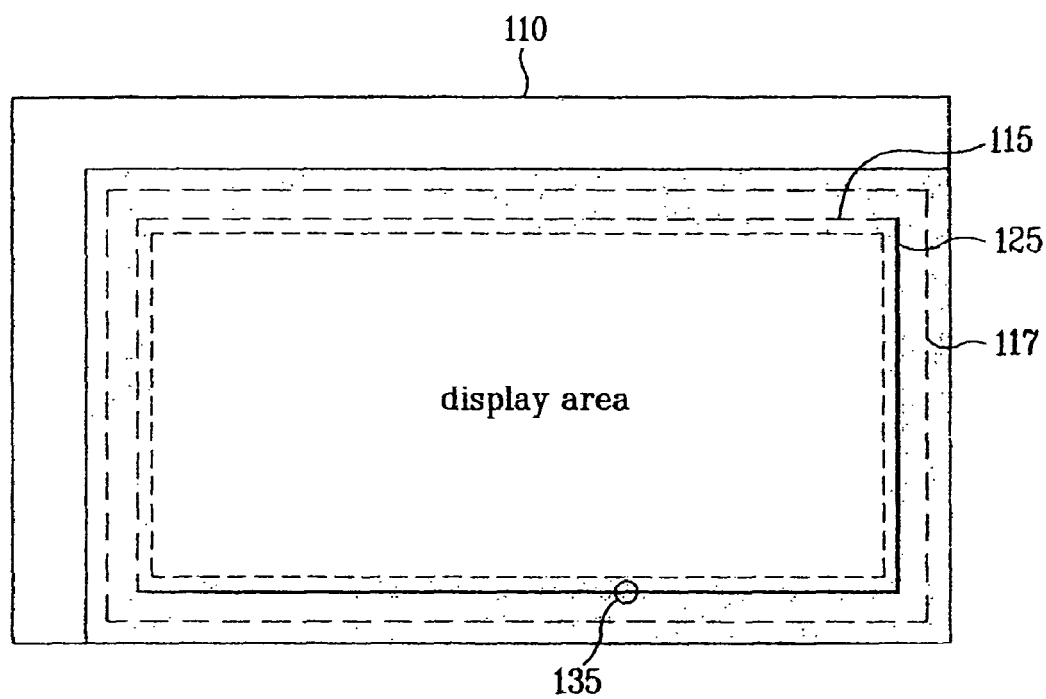
FIG. 9B is a plane view of a lower substrate corresponding to a metal pattern and a first/second seal pattern.

In this case, the second seal pattern 117 performs the dual function of bonding the lower and upper substrates 110 and 120 to each other, and also defining the buffer spacer 130 with the first seal pattern 115. Unlike the first seal pattern 115, as shown in FIG. 9B, the second seal pattern 117 is not formed to be in correspondence with the metal pattern 125. Accordingly, an interval between the lower and upper substrates 110 and 120 is uniform during the laser irradiation process. In FIG. 9B, a dotted line shown around the metal pattern 125 corresponds to a portion for the first seal pattern 115, and an outer dotted line corresponds to a portion of the second seal pattern 117 (herein, an innermost dotted line is corresponding to the display area).

The metal pattern 125 is a dummy pattern formed in the TFT array process, which is deformed, or sags, under laser irradiation during the process for repairing a gravity defect, to form the path. Accordingly, the metal pattern 125 sags during the repairing process to form the path and it is impossible to cut off the seal pattern formed on one substrate by external forces. Meanwhile, the first and second seal patterns 115 and 117 are formed in the non-display area, and a black matrix layer 140 is formed on the upper substrate 120 of the non-display area, to prevent light leakage.

Figure 10A:
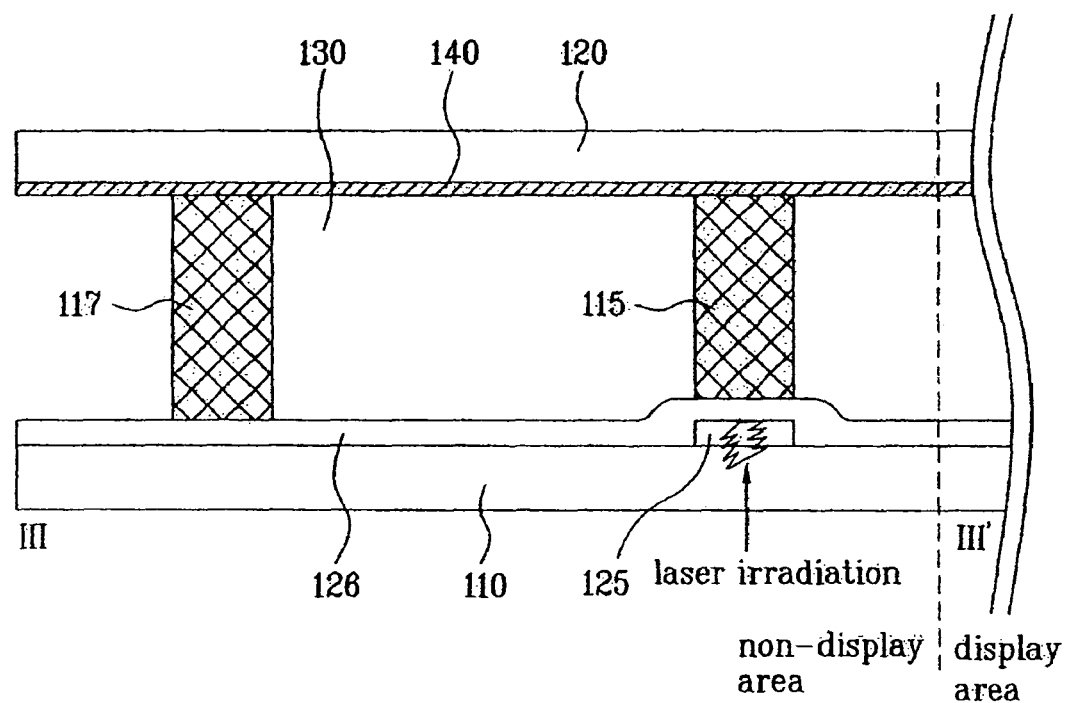
FIG. 10A is a cross sectional view of an LCD device taken along Section line III-III' of FIG. 8 and FIG. 9A in a process of irradiating a laser beam.
Figure 10B:
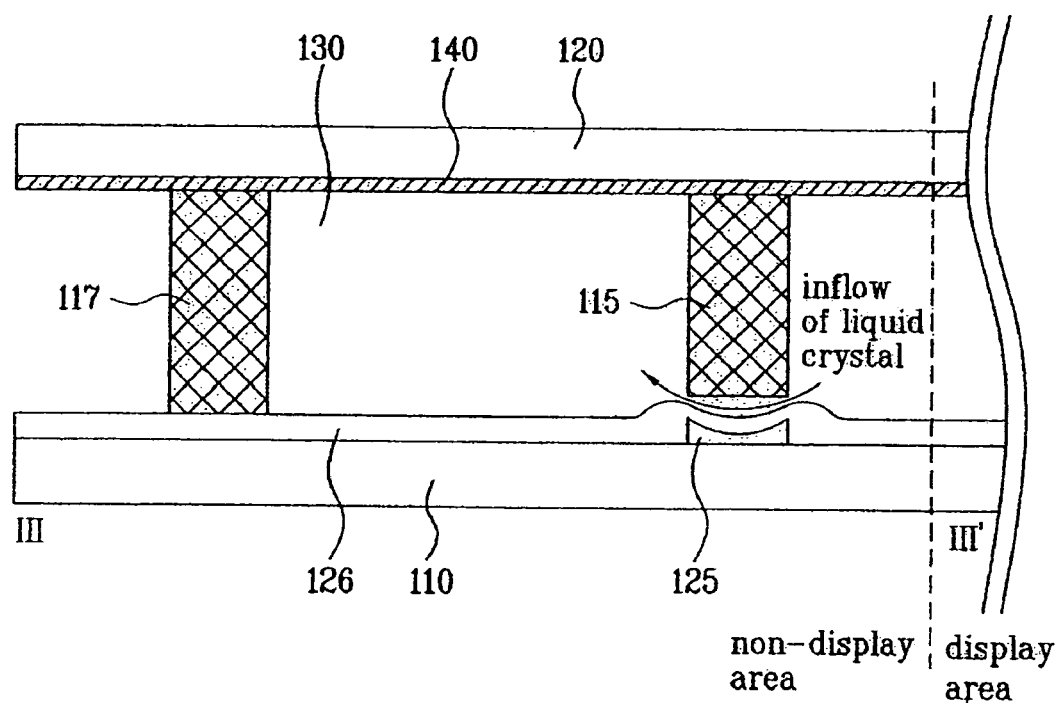
FIG. 10B is a cross sectional view of showing changes of an LCD device along Section line III-III' of FIG. 8 and FIG. 9A in a process of irradiating a laser beam.

A repairing process in accordance with first embodiment or the invention of the LCD device will be described as follows. In the repairing process of the LCD device according to the first embodiment of the present invention, as shown in FIG. 10A, in case of gravity defect, a laser beam is irradiated on the metal pattern 125 of the LCD device, whereby the metal pattern 125 and the insulating layer 126 are deformed, as shown in FIG. 10B. As a result, a predetermined space is created between the first seal pattern 115 and the saging metal pattern 125, through which surplus liquid crystal of the LCD panel 100 flows to the buffer space. In this case, the metal pattern 125 is not limited to a specific shape. Thus, the shape of the metal pattern 125 may be varied according to the intensity of the irradiating the laser beam.

In the repairing process of the LCD device according to the first embodiment of the present invention, the direct path created in the metal pattern 125 below the first seal pattern 115 surrounding the display area (active region) forms a connection point to the buffer space for storing surplus liquid crystal. Accordingly, the surplus liquid crystal can migrate to the buffer space through the path.

After bonding the lower and upper substrates 110 and 120 to each other, laser light is irradiated on a lower surface of the lower substrate 110 or an upper surface of the upper substrate 120. Preferably, the laser, irradiation is limited to an energy level sufficient cause the metal pattern 125 and the insulating layer 126 to sag without affecting the first seal pattern 115 formed between the lower and upper substrates 110 and 120. The present embodiment, the insulating layer 126 and the metal pattern 125 are fabricated during the TFT array process.

After the predetermined portion of the metal pattern 125 and the insulating layer 126 are deformed, a predetermined space appears between the first seal pattern 115 and the insulating layer 126. This space serves as the path for the surplus liquid crystal to the buffer space, that is, the space creator a liquid crystal inlet 135 (FIGS. 8 and 9).

In the meantime, since the liquid crystal inlet 135 is formed by the partial deformation the metal pattern 125, the liquid crystal inlet 135 is small. Thus, when liquid crystal flows from the display area of the LCD panel 100 to the buffer space 130 through the liquid crystal inlet 135, it spends a long time. In this respect, the LCD panel 100 is activated, whereby the surplus liquid crystal inside the display area of the LCD panel 100 flows to the buffer space 130 in a short time.

To help the flow of the surplus liquid crystal inside the display area of the LCD panel flow to the buffer space 130, an aging process is performed at a high temperature above a normal temperature. Thus, the surplus liquid crystal of the display area of the LCD panel is induced into the buffer space. At this time, the aging process is performed at a temperature that is low enough not to break the lower and upper substrates 110 and 120 of glass materials. For example, in order to activate the LCD panel 100, the aging process is preferably performed at a temperature of about 120 10° C. between about 5 and about 6 hours, or at a temperature of about 60 10° C. between about 12 and about 24 hours. Alternatively, the LCD panel is heated by a laser.

The size of buffer space 130, defined by spacing the first and second seal patterns 115 and 117 from each other, is determined based on the amount of liquid crystal needed for the LCD panel, or the control for the amount of liquid crystal.

Figure 11:
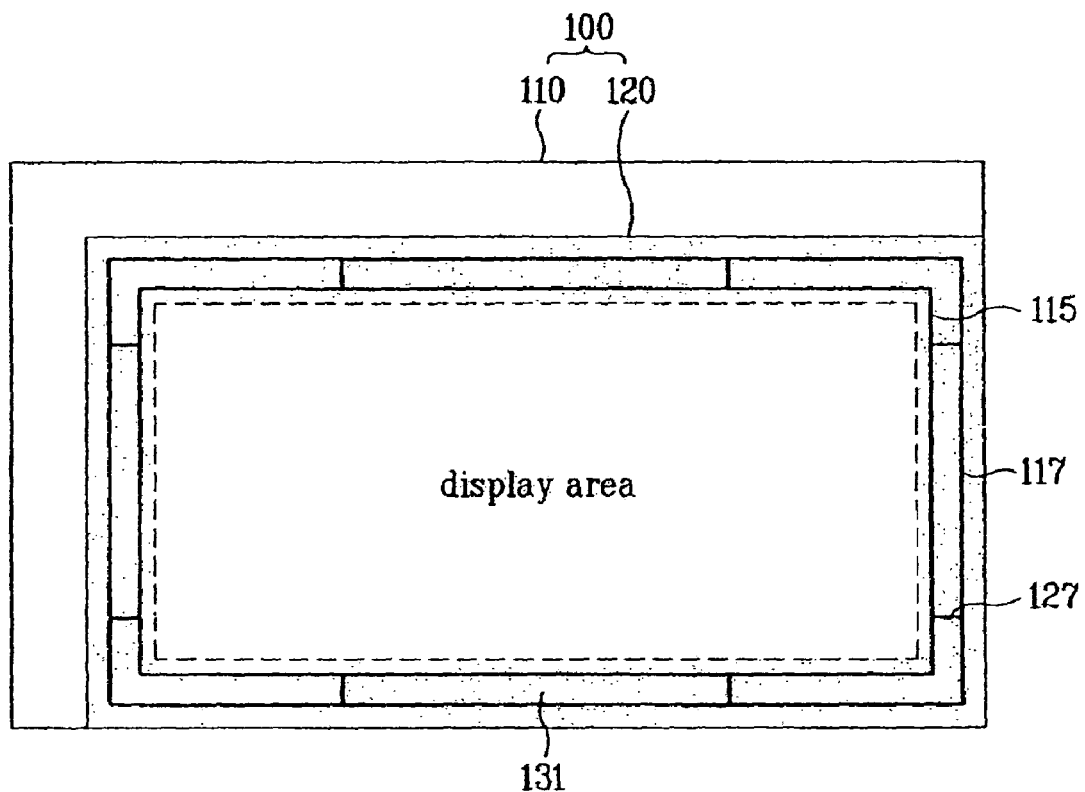
FIG. 11 is a plane view of an LCD device according to a second embodiment of the present invention.

Referring to FIGS. 11-14, an LCD device according to a second embodiment of the present invention, as shown in FIG. 11, includes a buffer space divided into a plurality of parts 131 by forming dividers 127 therein. The dividers 127 are formed of the same material as first and second seal patterns 115 and 117, wherein the dividers 127 cross the buffer space to meet with the first and second seal patterns 115 and 117.

The LCD device according to the second embodiment of the present invention includes an LCD panel 100 having display and non-display areas. A driving part (not shown) and a backlight unit (not shown) are connected with the LCD panel 100. More specifically, the LCD panel 100 includes a lower substrate 110 having a TFT array, an opposite upper substrate 120 having a color filter array, and a liquid crystal layer (not shown) formed between the lower and upper substrates 110 and 120. To create a margin for connecting with the driving part (not shown), the lower substrate 110 is relatively larger than the upper substrate 120.

Figure 13:
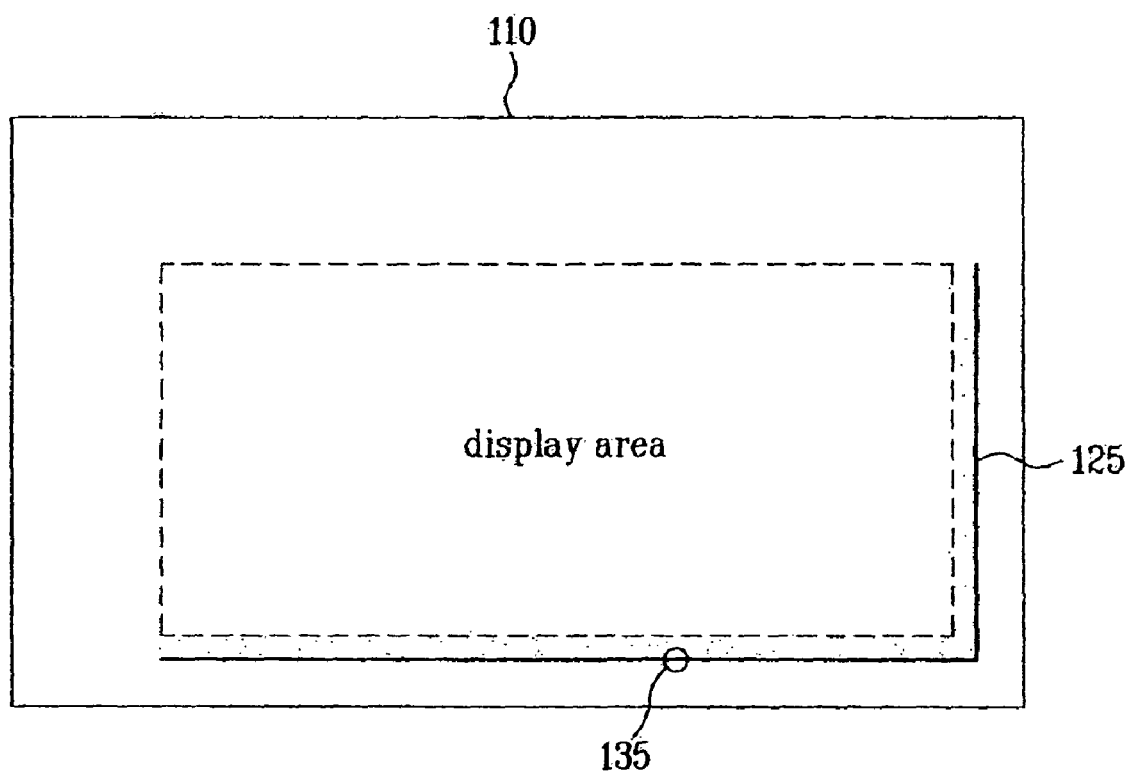
FIG. 13 is a plane view of a lower substrate having a metal pattern of FIG. 11.

In a fabrication process, the first and second seal patterns 115 and 117, respectively, are formed in the non-display area of any one of the lower and upper substrates 110 and 120, wherein the first and second seal patterns 115 and 117 surround the display area of any one substrate. At this time, the first and second seal patterns 115 and 117 are spaced apart from each other, to define the buffer space therebetween. Referring to FIG. 13, a metal pattern 125 is formed on the lower substrate 110 at a portion corresponding to the first seal pattern 115, and an insulating layer 126 (FIG. 14) is formed on an entire surface of the lower substrate 110 including the metal pattern 125.

The lower and upper substrates 110 and 120 are bonded to and supported each other by the first seal pattern 115. The metal pattern 125 is formed on the lower substrate 110 corresponding to a predetermined portion of the first seal pattern 115. The metal pattern 125 has to be substantially formed in a portion having no effect on a display mode, for example, in the non-display area. Also, since it is necessary to form a path by deforming the metal pattern 125 by laser irradiation, the metal pattern 125 has to be substantially formed in a portion having no gate pad or data pad, so that the liquid crystal is driven without any effect from the laser irradiation. Thus, as shown in FIG. 10A, the formation portion of the metal pattern 125 is limited to the non-display area except the pad. As shown in the drawings, the metal pattern 125 may optionally be formed in sequence, or not.

The second seal pattern 117 performs the dual functions of bonding the lower and upper substrates 110 and 120 to each other, and, also defining the buffer spacer with the first seal pattern 115. Unlike the first seal pattern 115, the second seal pattern 117 is not formed to be in correspondence with the metal pattern 125. Accordingly, an interval between the lower and upper substrates 110 and 120 is uniform during the laser irradiation process.

Figure 12:
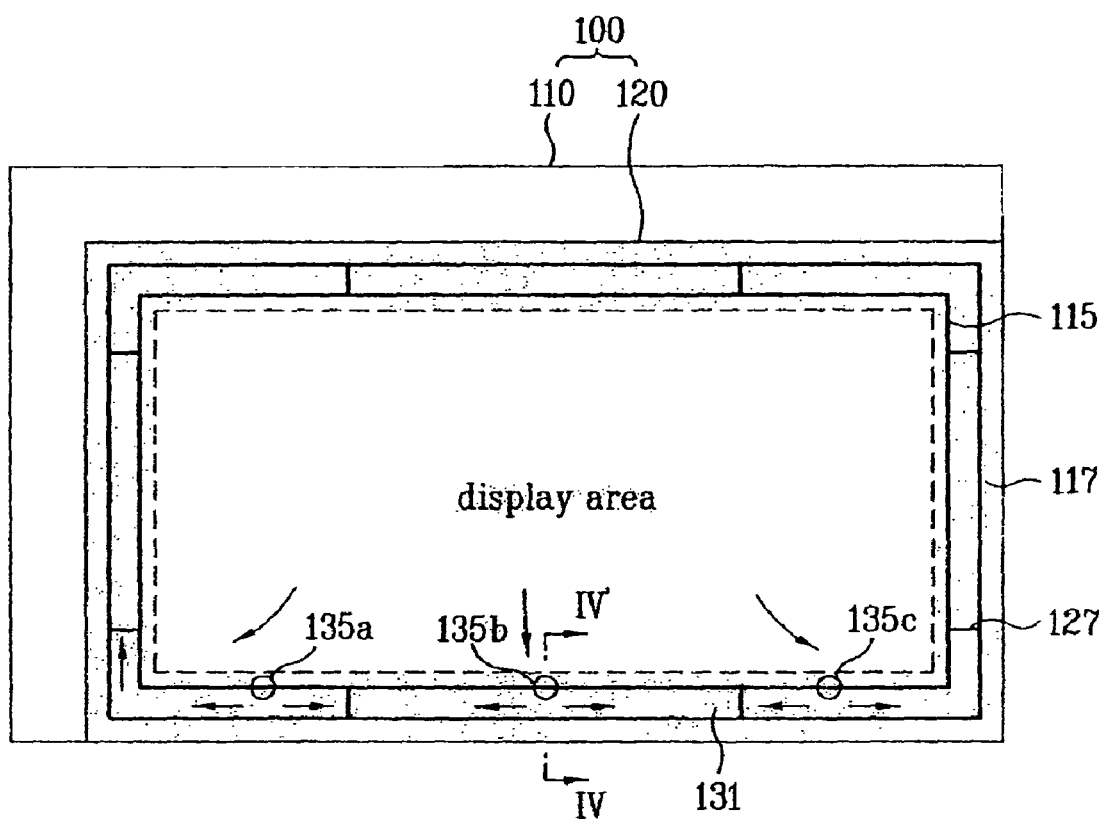
FIG. 12 is a plane view of a repairing method of an LCD device according to the second embodiment of the present invention.

At this time, the first and second seal patterns 115 and 117 are formed in the non-display area, and a black matrix layer 140 is formed on the upper substrate 120 of the non-display area to prevent light leakage. Also, the plurality of parts 131 are formed inside the buffer space by the dividers 127. The plurality of parts 131 are blocked with the dividers 127, in which a use scope of the parts 131 depends on the surplus amount of liquid crystal dispensed on the LCD panel. If the surplus amount of liquid crystal dispensed on the LCD panel is great, many parts 131 are required inside the buffer space. Thus, the laser irradiation process is performed an the metal pattern 125, thereby forming a plurality of liquid crystal inlets 135a, 135b and 135c (FIG. 12). At this time, the number of liquid crystal inlets 135a, 135b and 135c is varied with the amount of liquid crystal needed to prevent the gravity defect.

In the LCD device according to the second embodiment of the present invention, the number of dividers 127 and the position of the second seal pattern 117 for defining the buffer space are determined based on of the amount of liquid crystal for the LCD panel, or the control for the amount of liquid crystal.

Preferably, the dividers 127 are formed simultaneously when forming the first and second seal patterns 115 and 117 and before bonding the substrates to each other. At this time, the position of dividers 127 is determined based on the position of the desired path of the surplus liquid crystal in the display area.

The repairing process of the LCD device according to the second embodiment of the present invention will now be described. In the repairing process of the LCD device according to the second embodiment of the present invention, as shown in FIG. 12, the plurality of parts 131 are formed inside the buffer space, and the laser irradiation process is performed on the metal pattern 125 (FIG. 13) below the first seal pattern 115 in each part 131, thereby forming the plurality of liquid crystal inlets 135a, 135b and 135c.

Figure 14A:
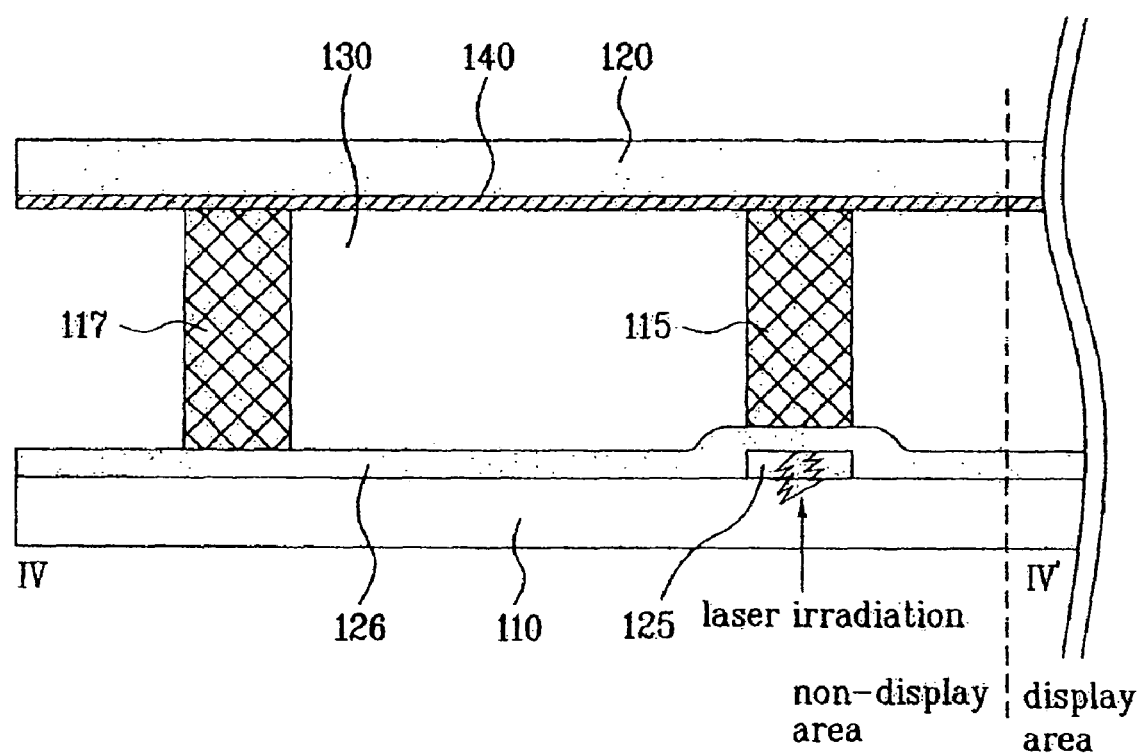
FIG. 14A is a cross sectional view of an LCD device along Section line IV-IV' of FIG. 12 in a process of irradiating a laser beam.
Figure 14B:
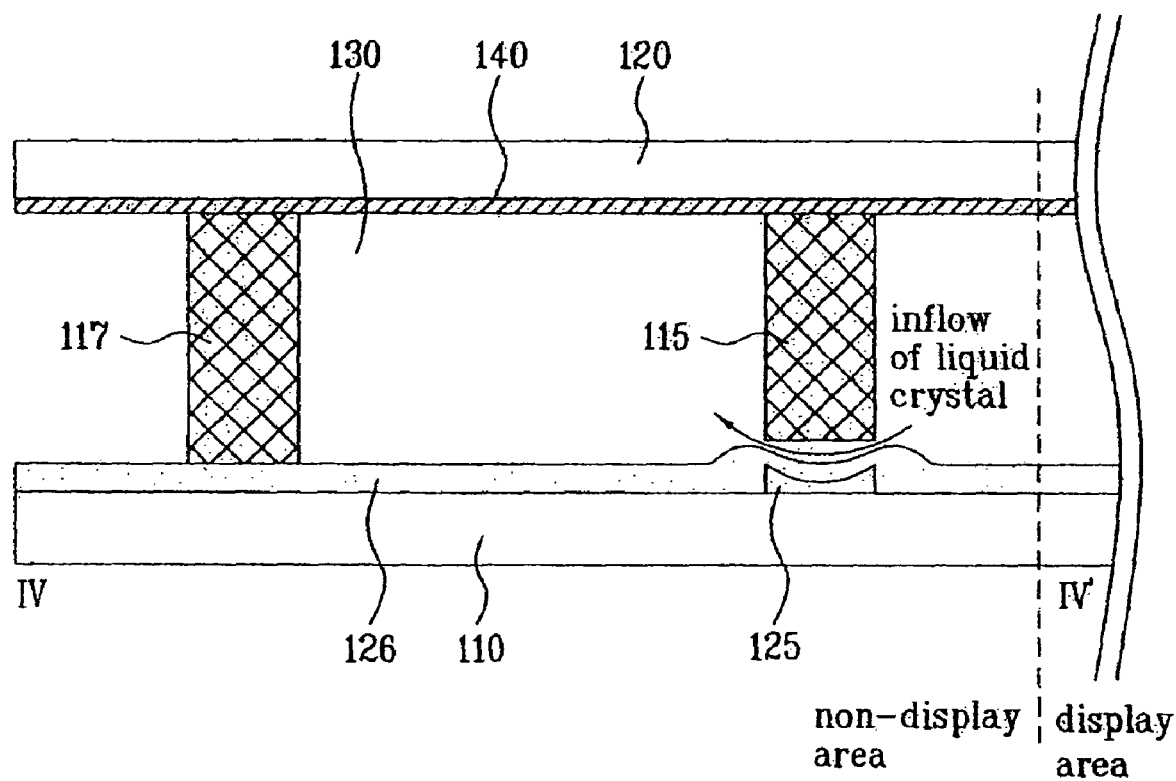
FIG. 14B is a cross sectional view showing changes of an LCD device along Section line IV-IV' of FIG. 12 after a process of irradiating a laser beam.

As shown in FIG. 14a, in case of gravity defect, laser light is irradiated on the metal pattern 125 of the LCD device, whereby the metal pattern 125 and the insulating layer 126 sag, as shown in FIG. 14b. As a result, a predetermined space forms between the first seal pattern 115 and the falling metal pattern 125, through which surplus liquid crystal of the LCD panel 100 flows to the buffer space. In accordance with the present embodiment, the metal pattern 125 is not limited to a specific shape, but can be varied according to the intensity of the laser beam.

In the repairing process of the LCD device according to the first embodiment of the present invention, the direct path created in the metal pattern 125 below the first seal pattern 115 surrounding the display area (active region), forms a connection point to the buffer space for storing surplus liquid crystal. Accordingly, the surplus liquid crystal migrates to the buffer space.

In the repairing process for a gravity defect, the path is formed as one point in a predetermined portion of the metal pattern 125 around the display area (dotted area) of the LCD panel 100. By forming additional paths, it is possible to increase the number of parts 131 to which the surplus liquid crystal flows.

Like the first embodiment of the present invention, the repairing process for a gravity defect of the LCD device according to the second embodiment of the present invention, it is possible to decrease the repairing process time.

Figure 15:
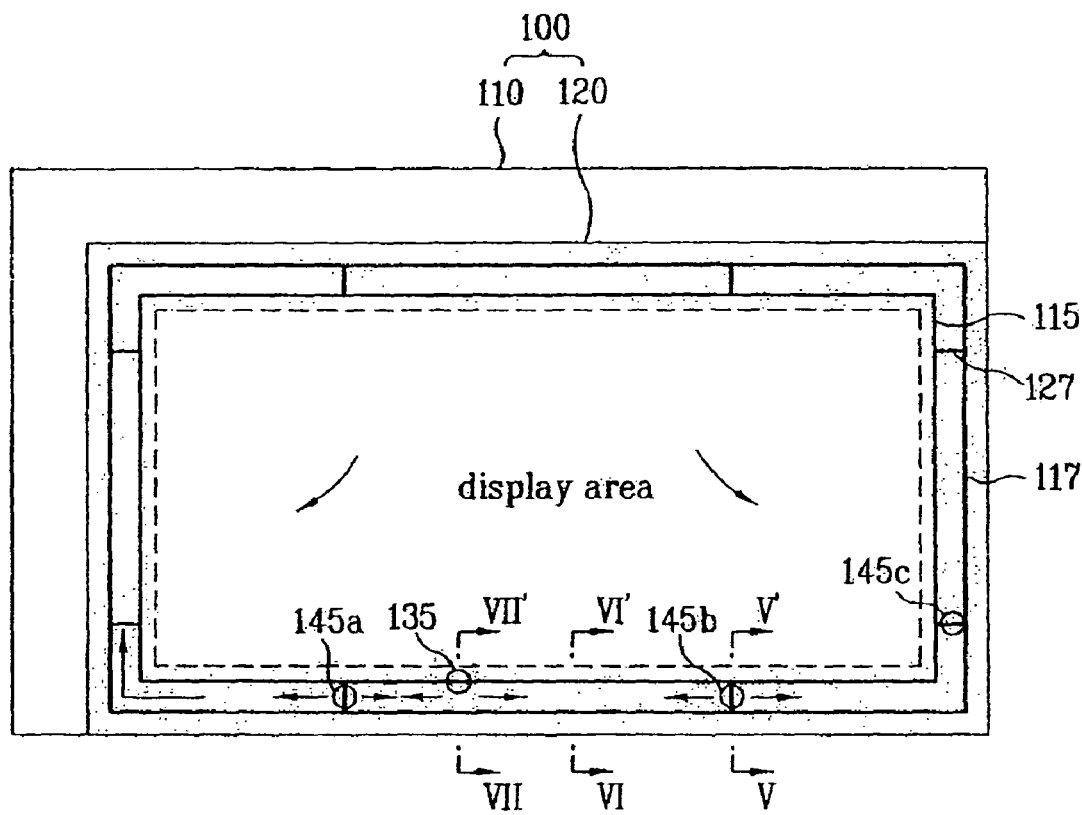
FIG. 15 is a plane view of an LCD device and a repairing method according to a third embodiment of the present invention.
Figure 16A:
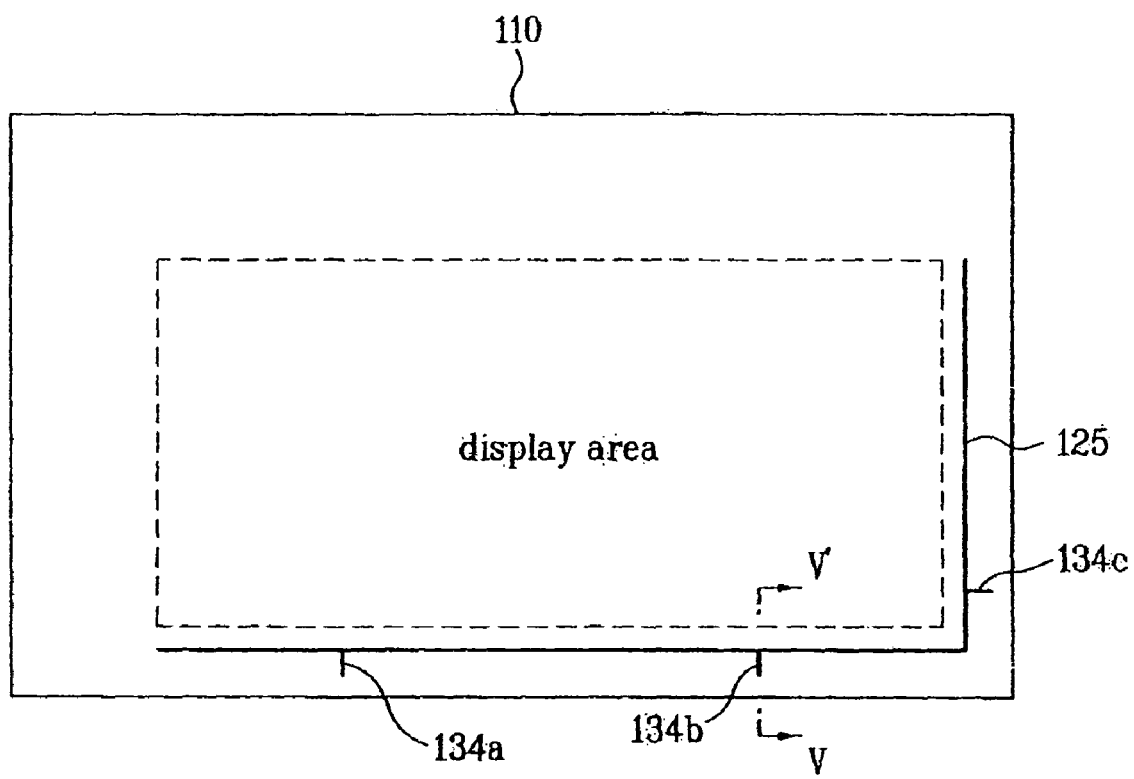
FIG. 16A is a plane view of a lower substrate having a metal pattern of FIG. 15.
Figure 16B:
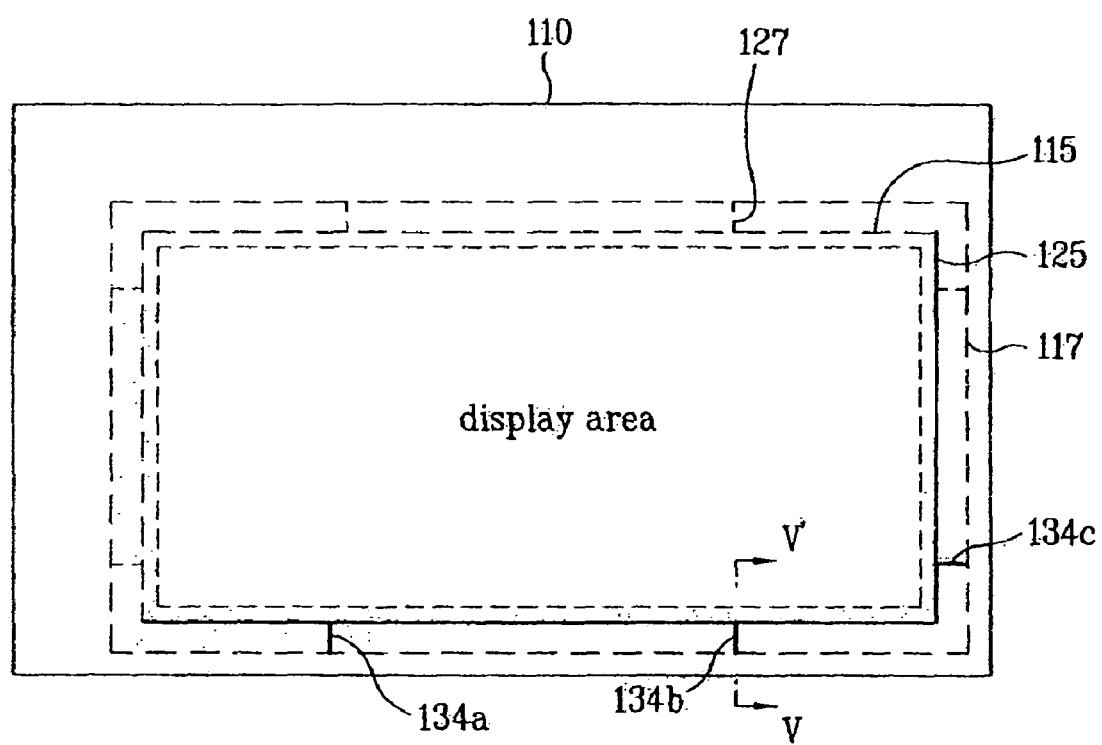
FIG. 16B is a plane view of a lower substrate corresponding to a metal pattern and a first/second seal pattern.

FIG. 15 is a plane view of an LCD device and a repairing method thereof, according to a third embodiment of the present invention. FIG. 16A is a plane view of a lower substrate having a metal pattern of FIG. 15. FIG. 16B is a plane view of a lower substrate corresponding to a metal pattern and a first and second seal pattern.

Figure 17A:
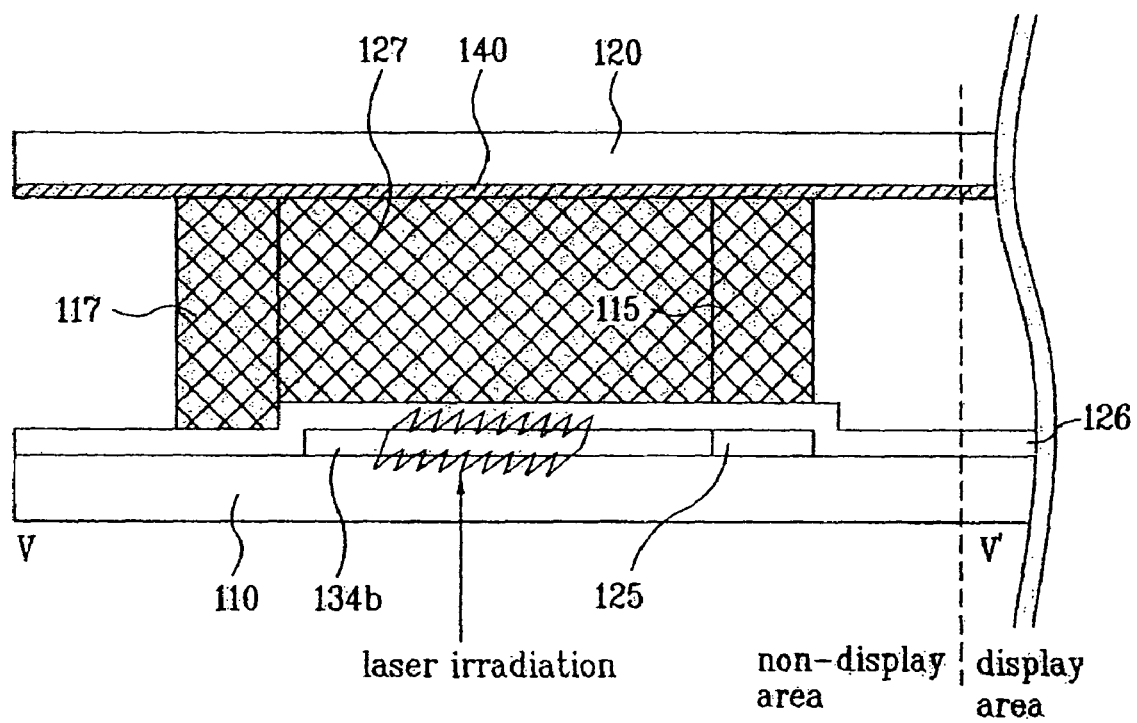
FIG. 17A is a cross sectional view of an LCD device taken along Section line V-V' of FIG. 15 in a process of irradiating a laser beam.
Figure 17B:
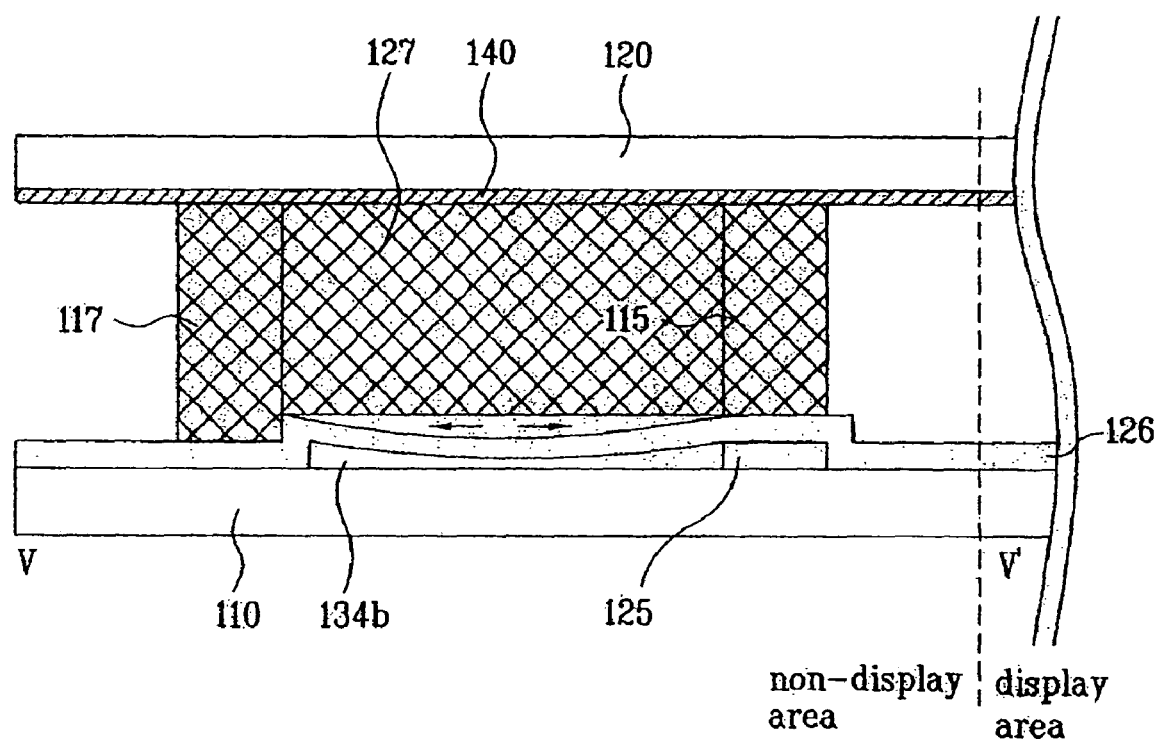
FIG. 17B is a cross sectional view of showing changes of an LCD device along Section line V-V' of FIG. 15 after a process of irradiating a laser beam.
Figure 18:
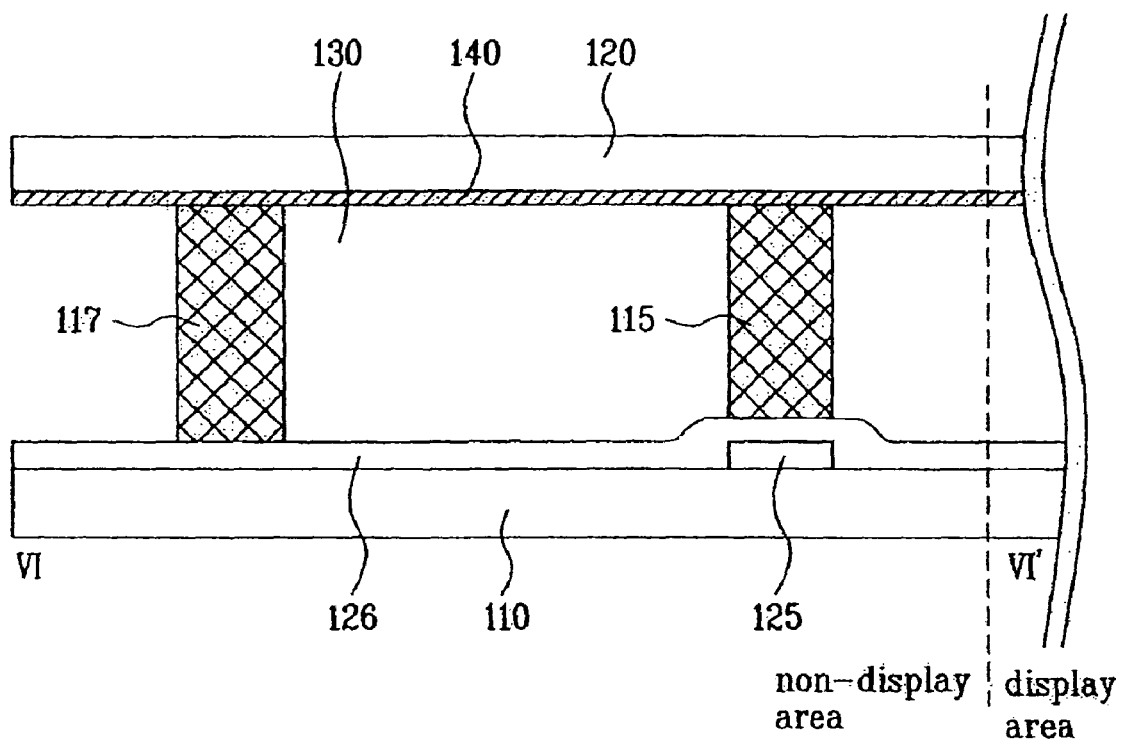
FIG. 18 is a cross sectional view of an LCD device along Section line VI-VI' of FIG. 15.

In an LCD device according to the third embodiment of the present invention, as shown in FIG. 15, divider metal patterns 134a, 134b and 134c are formed below dividers 127 (FIG. 17A). The other portions of the LCD device according to the third embodiment of the present invention have the same structure as those of the LCD device according to the second embodiment of the present invention, whereby the same reference numbers will be used in FIG. 15 to refer to the same or like parts of FIG. 12.

The divider metal patterns 134a, 134b and 134c may be formed below the dividers 127. As shown in FIG. 16A and FIG. 16B, the divider metal patterns 134a, 134b and 134c may be formed at selected locations portions selectively. Also, the metal pattern 125 is formed on the non-display area of the lower substrate 110 corresponding to a predetermined portion of the first seal pattern 115.

The repairing process of the LCD device according to the third embodiment of the present invention will now be described.

Referring to FIGS. 15-19, first, as shown in FIG. 15 and FIG. 17a, the laser irradiation process is performed to a predetermined portion of the metal pattern 125, thereby forming a liquid crystal inlet 135. At this time, the liquid crystal inlet 135 is created to form a path for liquid crystal to flow from the display area of the LCD panel 100 to one part 131 of the buffer space (FIG. 12).

Figure 19A:
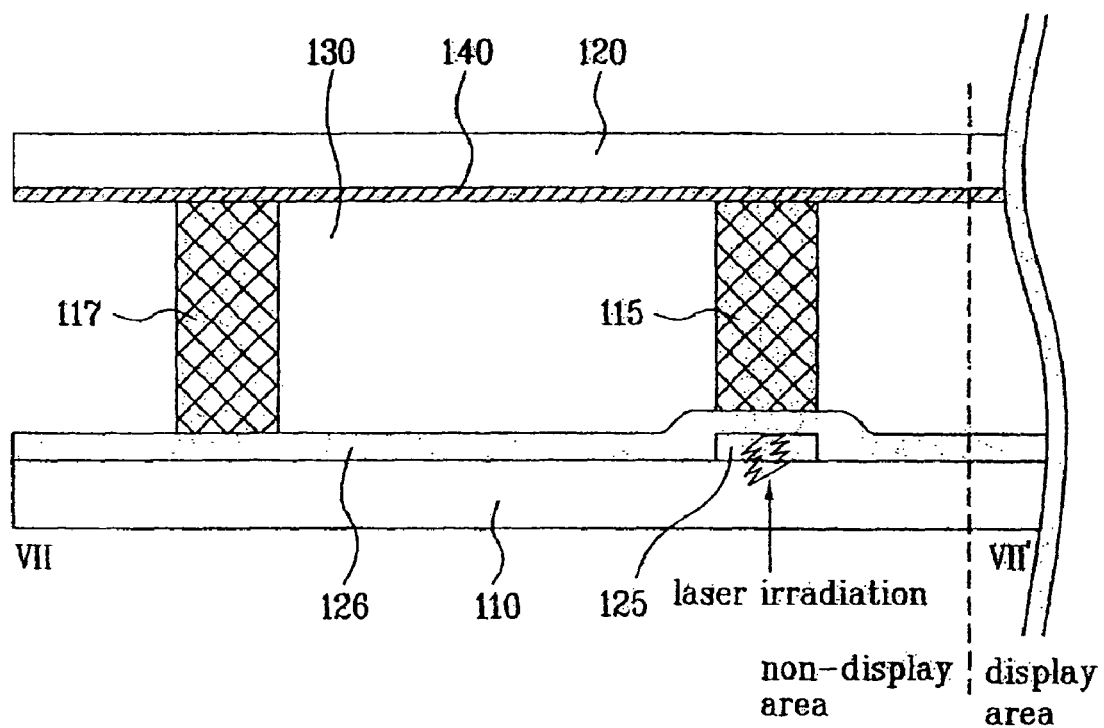
FIG. 19A is a cross sectional view of an LCD device along Section line VII-VII' of FIG. 15 in a process of irradiating a laser beam.
Figure 19B:
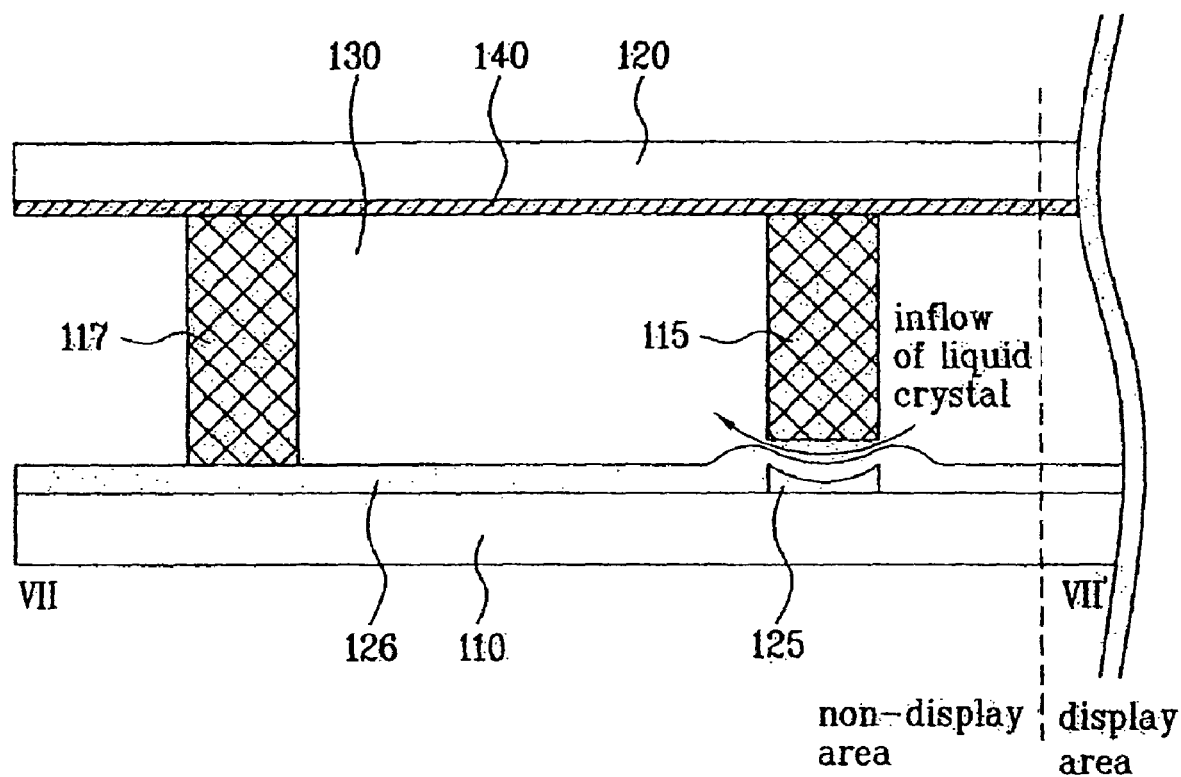
FIG. 19B is a cross sectional view of showing changes of an LCD device along Section line VII-VII' of FIG. 15 after a process of irradiating a laser beam.

In this state, the divider 127 divides the inside of the buffer space (space defined by the first and second seal patterns). When the surplus amount of liquid crystal dispensed on the LCD panel is great, as shown in FIG. 19A, the divider metal patterns 134a, 134b and 134c, provided below the dividers 127 adjacent the liquid crystal inlet 135, are irradiated with the laser. As a result, as shown in FIG. 19B, the divider metal patterns 134a, 134b and 134c sag, thereby forming liquid crystal paths 145a, 145b and 145c. Liquid crystal coming to the predetermined part through the liquid crystal inlet 135 flows to the adjacent part through the liquid crystal paths 145a, 145b and 145c.

In the present embodiment, to smoothly discharge the excess liquid crystal dispensed on the display area of the LCD panel 100 to the buffer space, the for the gravity defect, can be repaired by performing the method according to the second embodiment of the present invention with the structure according to the third embodiment of the present invention. That is, different portions of the metal pattern 125, provided below the first seal pattern 115, are irradiated with laser, thereby forming the plurality of liquid crystal inlets. Also, the divider metal patterns 134a, 134b and 134c, provided below the dividers 127, are irradiated with laser, thereby progressing the repairing process. Like the first and second embodiments of the present invention, in the present embodiment, it is possible to decrease the repairing process time by the rapid inflow of liquid crystal to the buffer space.

Accordingly, the LCD device and the repairing method according to the present invention have the following advantages. First, the first and second seal patterns are spaced from each other. In this state, the metal pattern is formed below the first seal pattern adjacent to the display area of the LCD panel, and then the metal pattern is irradiated with laser, thereby forming a path for the surplus liquid crystal in the LCD panel. As a result, it is possible to solve the gravity defect or problem. Also, by changing the structure of the seal pattern and forming the additional metal pattern during the TFT array process, it is possible to repair gravity defect before completing the fabrication of device.

It will be apparent to those skilled in the art that various modifications and variations can be made in the present invention. Thus, it is intended that the present invention encompass the modifications and variations of this invention provided they come within the scope of the appended claims and their equivalents.

What is claimed:

1. A liquid crystal display (LCD) device comprising:
    a liquid crystal panel including first and second substrates bonded to each other, and having a display area and non-display area;
    first and second seal patterns surrounding the display area and spaced apart from each other on the non-display area between the first and second substrates and defining a buffer space therebetween; and
    a metal pattern formed on the first substrate under the first seal pattern, wherein the metal pattern is deformed by laser irradiation to form a path for liquid crystal to flow between the buffer space and the display area.

2. The LCD device of claim 1, wherein the path is configured for surplus liquid crystal when liquid crystal is oversupplied between the first and second substrate.

3. The LCD device of claim 1, wherein the metal pattern includes at least one path for liquid crystal to flow to the buffer space.

4. The LCD device of claim 1, wherein the first substrate includes a plurality of gate lines and data lines crossing each other in the display area.

5. The LCD device of claim 4, wherein the metal pattern comprises substantially the same material as the gate lines.

6. The LCD device of claim 5, wherein the metal pattern is formed on the same layer as the gate lines.

7. The LCD device of claim 4, wherein the metal pattern comprises substantially the same material as the data lines.

8. The LCD device of claim 7, wherein the metal pattern is formed on the same layer with the data lines.

9. The LCD device of claim 1, wherein the first substrate includes gate pad and data pad in the non-display area.

10. The LCD device of claim 9, wherein the metal pattern is formed on the first substrate having no gate and data pads of the LCD panel.

11. The LCD device of claim 1, further comprising an insulating layer between the metal pattern and the first and second seal patterns.

* * * * *